United States Patent [19]
Jenkins et al.

[11] Patent Number: 5,812,669
[45] Date of Patent: Sep. 22, 1998

[54] METHOD AND SYSTEM FOR PROVIDING SECURE EDI OVER AN OPEN NETWORK

[76] Inventors: Lew Jenkins, 819 Slater Ave., Pleasant Hill, Calif. 94523; Emmanuel K. Pasetes, Jr., 55 Woodranch Cir., Danville, Calif. 94525

[21] Appl. No.: 503,984

[22] Filed: Jul. 19, 1995

[51] Int. Cl.$^6$ ............................ H04L 9/00; H04L 9/30; H04L 9/32
[52] U.S. Cl. ............................ 380/25; 380/21; 380/23; 380/30; 380/49
[58] Field of Search .................. 380/9, 21, 23, 380/25, 30, 44, 46, 49, 50

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,267,782 | 5/1981 | Talbott . |
| 4,405,829 | 9/1983 | Rivest et al. . |
| 4,424,414 | 1/1984 | Hellman et al. . |
| 4,471,164 | 9/1984 | Henry . |
| 4,578,531 | 3/1986 | Everhart et al. . |
| 4,625,076 | 11/1986 | Okamoto et al. . |
| 4,723,284 | 2/1988 | Munck et al. . |
| 4,823,388 | 4/1989 | Mizutani et al. . |
| 4,868,877 | 9/1989 | Fischer . |
| 4,876,716 | 10/1989 | Okamoto . |
| 4,885,777 | 12/1989 | Takaragi et al. . |
| 4,893,338 | 1/1990 | Pastor . |
| 4,987,593 | 1/1991 | Chaum . |
| 4,991,210 | 2/1991 | Chaum . |
| 5,001,752 | 3/1991 | Fischer . |
| 5,005,200 | 4/1991 | Fischer . |
| 5,018,196 | 5/1991 | Takaragi . |
| 5,022,080 | 6/1991 | Durst et al. . |
| 5,073,934 | 12/1991 | Matyas et al. . |
| 5,073,935 | 12/1991 | Pastor . |
| 5,136,643 | 8/1992 | Fischer . |
| 5,136,646 | 8/1992 | Haber et al. . |
| 5,142,577 | 8/1992 | Pastor . |
| 5,142,578 | 8/1992 | Matyas et al. . |
| 5,199,074 | 3/1993 | Thor . |
| 5,202,977 | 4/1993 | Pasetes, Jr. et al. . |
| 5,204,961 | 4/1993 | Barlow . |
| 5,208,858 | 5/1993 | Vollert et al. . |
| 5,214,702 | 5/1993 | Fischer . |
| 5,222,140 | 6/1993 | Beller et al. . |
| 5,224,166 | 6/1993 | Hartman, Jr. . |
| 5,226,709 | 7/1993 | Labrache . |
| 5,237,611 | 8/1993 | Rasmussen et al. . |
| 5,253,294 | 10/1993 | Maurer . |
| 5,261,002 | 11/1993 | Perlman et al. . |

(List continued on next page.)

*Primary Examiner*—Bernarr E. Gregory
*Attorney, Agent, or Firm*—Bryan Cave LLP

[57] ABSTRACT

A method and system for selectively interconnecting a plurality of computers (112,114) over an open public network (120,102,122), such as the INTERNET, provides a private secure computer exchange of EDI interchange communications between a sender computer (112) and a recipient computer (114), each of which has an associated public key and an associated private key, such as in an RSA type cryptographic communication system (100). The associated EDI acknowledgement message, such as the AUTACK, is used to provide secure authentication and non-repudiation of both origin and receipt of the secure private EDI interchange communications transmitted over the open public network (120,102,122) with the AUTACK transmitted from the sender computer (112) being digitally signed with the sender's private key, and with the reply AUTACK transmitted from the recipient computer (114) being digitally signed with the recipient's private key. The respective digitally signed AUTACKs are decrypted after receipt by using the public key associated with the private key used to provide the digital signature. The transmitted AUTACK from the sender computer (112) includes an MD5 for the entire EDI interchange as well as an MD5 of the AUTACK, with the AUTACK, thus, being used to provide the digital signature. The reply AUTACK from the recipient computer (114) includes an MD5 of the reply AUTACK. The ability to conduct business over the network (120,102,122) is controlled by private trading partner agreement communications which provide key certification.

50 Claims, 43 Drawing Sheets

U.S. PATENT DOCUMENTS

| | | |
|---|---|---|
| 5,268,962 | 12/1993 | Abadi et al. . |
| 5,297,208 | 3/1994 | Schlafly et al. . |
| 5,299,263 | 3/1994 | Beller et al. . |
| 5,303,303 | 4/1994 | White . |
| 5,311,591 | 5/1994 | Fischer . |
| 5,337,360 | 8/1994 | Fischer . |
| 5,339,361 | 8/1994 | Schwalm et al. . |
| 5,351,293 | 9/1994 | Michener et al. . |
| 5,351,302 | 9/1994 | Leighton et al. . |
| 5,367,573 | 11/1994 | Quimby . |
| 5,369,702 | 11/1994 | Shanton . |
| 5,369,705 | 11/1994 | Bird et al. . |
| 5,373,558 | 12/1994 | Chaum . |
| 5,375,169 | 12/1994 | Scheidt et al. . |
| 5,390,247 | 2/1995 | Fischer ........................................ 380/25 |

| TRADING PARTNER PROFILES | | |
|---|---|---|
| FILE   EDIT   KEYS | | HELP |
| TRADING PARTNER ID | COMPANY NAME | TYPE |
| CISCO | CISCO TRADING PARTNER | REMOTE |
| SEARS | SEARS TRADING PARTNER | REMOTE |
| ME | MYSELF HERE | LOCAL |

FIG. 15

TRADING PARTNER PROFILE

- TRADING PARTNER ID: TRADING PARTNER
- COMPANY NAME: COMPANY NAME
- ADDRESS:
  - COMPANY NAME
  - COMPANY NAME
  - COMPANY NAME
- TYPE: REMOTE          CONTACT INFO...
- EDI QUALIFIER/ID
  - QUALIFIER    ID

[ ADD... ]   [ MODIFY... ]   [ REMOVE ]

[ BIND KEYS... ]

[ OK ]    [ CANCEL ]    [ HELP ]

FIG. 16

TRADING PARTNER PROFILE - CONTACT INFORMATION

NAME
TITLE
PHONE
FAX
E-MAIL
COMMENTS

OK  CANCEL  HELP

TRADING PARTNER - BOUND KEYS

TRADING PARTNER ID
COMPANY NAME

BOUND KEYS

| KEY ID | DISTINGUISHED NAME | TYPE |
|--------|--------------------|----|
| COSTCO | COSCO PUBLIC KEY | REMOTE |
| PREMENOS | PREMENOS PUBLIC KEY | LOCAL |

BIND...  UNBIND...  PRINT

CLOSE  HELP

FIG. 19

| | TRADING PARTNER -- BIND KEYS | |
|---|---|---|

TRADING PARTNER ID
COMPANY NAME
SELECT A KEY TO BIND AND PRESS OK

| KEY ID | DISTINGUISHED NAME | TYPE |
|---|---|---|
| CISCO | THE CISCO PUBLIC KEY | REMOTE |
| SEARS | THE SEARS PUBLIC KEY | REMOTE |

KEY INFO...

| OK | CANCEL | HELP |
|---|---|---|

FIG. 20

| | TRADING PARTNER AGREEMENTS | | | |
|---|---|---|---|---|
| FILE  EDIT  VIEW | | | | HELP |
| REMOTE | LOCAL | INBOUND STATUS | OUTBOUND STATUS | |
| CISCO | ME | ACTIVE | UNDEFINED | |
| SEARS | PREMENOS | UNDEFINED | ACTIVE | |
| DEI | ME | HELD | UNDEFINED | |

FIG. 22

TRADING PARTNER AGREEMENT

REMOTE TRADING PARTNER
- REMOTE ID: SEARS
- KEY ID:
- QUALIFIER / ID:

LOCAL TRADING PARTNER
- LOCAL ID: ME
- KEY ID:
- QUALIFIER / ID:

INBOUND ROUTING STATUS: ACTIVE — DETAILS ...
OUTBOUND ROUTING STATUS: ACTIVE — DETAILS ...

[ OK ]   [ CANCEL ]   [ HELP ]

```
                TRADING PARTNER AGREEMENT - OUTBOUND ROUTING
    REMOTE ID    [            ]
    LOCAL ID     [            ]           STATUS  [        ]
           ◇ SECURITY    ◇ TRANSPORT    ◇ RETRANSMISSION
    SECURITY
          ☐ GENERATE NON-REPUDIATION OF ORIGIN
            REMOTE QUALIFIER / ID [                    ⬇]
            LOCAL QUALIFIER / ID  [                    ⬇]
          ☐ EXPECT NON-REPUDIATION OF RECEIPT
            GENERATE ENCRYPTION        [ NONE ]

[  OK  ]           [ CANCEL ]           [ HELP ]
```

FIG. 25

```
┌─────────────────────────────────────────────────────────────┐
│          TRADING PARTNER AGREEMENT - OUTBOUND ROUTING       │
│                                                             │
│   REMOTE ID   [            ]                                │
│   LOCAL ID    [            ]      STATUS  [          ]      │
│                                                             │
│        ┌──────────────────────────────────────────┐         │
│        │  ◇ SECURITY   ◇ TRANSPORT  ◇ RETRANSMISSION │       │
│        └──────────────────────────────────────────┘         │
│                                                             │
│   ┌─ TRANSPORT ─────────────────────────────────────┐       │
│   │                   E-MAIL ADDRESSES              │       │
│   │   SENDER    [                              ⇩]   │       │
│   │   RECEIVER  [                              ⇩]   │       │
│   │   MAXIMUM MIME MESSAGE SIZE  [          ]       │       │
│   │                                                 │       │
│   └─────────────────────────────────────────────────┘       │
│                                                             │
│   [   OK   ]         [  CANCEL  ]          [  HELP  ]       │
└─────────────────────────────────────────────────────────────┘
```

| KEY MANAGEMENT | | | | |
|---|---|---|---|---|
| FILE  EDIT  VIEW | | | | HELP |
| KEY ID | DISTINGUISHED NAME | EFFECTIVE DATE | TYPE | STATUS |
| CISCO | THE CISCO PUBLIC KEY | MM:DD:YY | REMOTE | ACTIVE |
| MINE | MY PUBLIC KEY | MM:DD:YY | LOCAL | ACTIVE |
| SEARS | SEARS PUBLIC KEY | MM:DD:YY | REMOTE | ACTIVE |

FIG. 29

| KEY-LOCAL | |
|---|---|

KEY ID REIFY

DISTINGUISHED NAME
- COUNTRY: AF AFGHANISTAN
- ORGANIZATION: KKK
- ORGANIZATIONAL UNIT: ALABAMA

SERIAL NUMBER: XR71
EFFECTIVE DATE: MM/DD/YY HH:MM:SS
STATUS: ACTIVE  [DETAILS...]

KEY GENERATION

[GENERATE KEY PAIR...]

PUBLIC KEY:

VERIFICATION DIGEST:

[OK]  [CANCEL]  [HELP]

PUBLIC KEY - EXPORT

KEY ID

DISTINGUISHED NAME

SERIAL NUMBER

EFFECTIVE DATE  MM/DD/YY HH:MM:SS

COPY PUBLIC KEY TO THE FOLLOWING FILE

BROWSE...

OK     CANCEL     HELP

FIG. 33

| TRACKING -- INTERCHANGES | | |
|---|---|---|
| INTERCHANGE | AUTACK STATUS | REMOTE TRADING PARTNER |
| 9999999999999999999 | NRR SENT | CISCO |
| 9999999999999999999 | NRR RECV | SEARS |

EDI: INTERCHANGE NUMBER: 99999999999999999999
NON-REPUDIATION OF RECEIPT AUTACK TRACKING ID: 9999999999
 RECEIVED DATE AND TIME: 99/99/9999 99:99:99
NON-REPUDIATION OF RECEIPT AUTACK: SENT DATA AND TIME: 99/99/9999 99:99:99
STATUS:
DUPLICATED:
SENDER:

[VIEW EDI DATA]  [PRINT...]

[CLOSE]  [HELP]

```
                AUDIT LOG -- SELECT ROWS

LOG ROWS TO DISPLAY

☐ START DATE      MM/DD/YY HH:MM:SS
   ☐ END DATE        MM/DD/YY HH:MM:SS
   ☐ PROGRAM NAME

MAXIMUM NUMBER OF ROWS    1000

OK              CANCEL              HELP
```

FIG. 40

VIEW COLUMNS

SELECT COLUMN ATTRIBUTES

| DISPLAY | COLUMN NAME |
|---------|-------------|
|         |             |
|         |             |
|         |             |
|         |             |
|         |             |
|         |             |
|         |             |
|         |             |
|         |             |

EDIT COLUMN
☐ DISPLAY     APPLY

OK     CANCEL     HELP

METHOD AND SYSTEM FOR PROVIDING SECURE EDI OVER AN OPEN NETWORK

BACKGROUND OF THE INVENTION

Field of the Invention

The present invention relates to methods and systems for providing secure EDI over an open system network, such as the INTERNET, and particularly to an improved method and system for providing a secure EDI mailer over an open network which employs an RSA type public/private key encryption scheme in order to deliver secure authentication, and non-repudiation of both origin and receipt.

Public/private key secure communication systems over an open network are well known, such as described in U.S. Pat. Nos. 4,578,531; 4,471,164; 5,268,962; 5,142,577; 4,893,338; 5,222,140; 5,261,002; 5,073,934; 5,303,303; 5,297,208; 5,369,705; 5,351,293; 5,375,169; 5,224,166; 5,253,294; and 5,237,611. The RSA public/private key encryption scheme, is a well-known public key system for providing secure messages over an open network, such as the INTERNET, and is described in various issued United States patents, such as U.S. Pat. Nos. 4,405,829; 4,424,414; 4,200,770; 4,218,582; 5,073,935; and 4,723,284, the contents of which are incorporated by reference herein. In addition, the concept of non-repudiation of origin is known, such as described in U.S. Pat. Nos. 5,226,709; and 5,367,573; as well as such systems in which digital signatures are employed in public/private key systems, such as described in U.S. Pat. Nos. 5,311,591; 5,214,702; 5,337,360; 4,868,877; 5,001,752; 5,005,200; 5,136,643; 5,018,196; 4,885,777; 4,267,782; 5,351,302; 5,208,858; 5,299,263; 5,142,578; 4,987,593; 4,991,210; 5,339,361; 5,373,558; 4,625,076; and the Entrust system marketed by Northern Telecom. Furthermore, various other secure transmission systems have been developed over the years in an attempt to try to provide secure business communications over public or private networks, such as described in U.S. Pat. Nos. 5,369,702; 4,876,716; 5,199,074; 4,823,388; 5,268,962; 5,022,080; 5,136,646; and 5,204,961. Also, the use of electronic data or document interchange or EDI to transmit business communications from peer to peer is known in the art, such as described, by way of example, in U.S. Pat. No. 5,202,977 owned by the assignee herein, or in previously mentioned U.S. Pat. No. 5,337,360. However, applicants are not aware of any successful prior art attempts to use the INTERNET, or any other widely accessible open network, such as telephone lines or any TCP/IP system, in which a secure public key/private key system, such as RSA, has been successfully combined with EDI to provide authentication and non-repudiation of both origin and receipt in a secure peer-to-peer private transaction which can occur at any time over the open network without requiring password management, while also providing verification of message integrity. Such a system eliminates the need for private valve-added networks and other third party private networks as well as ensuring the commercial feasibility of a private peer-to-peer business transaction over a widely available open network using EDI. The certainty of non-repudiation and authentication eliminates the ability of either party to deny that the transaction was approved and eliminates doubt as to the contents of the EDI document giving rise to the transaction. The ability of the method and system of the present invention to provide a secure EDI mailer in combination with an RSA type public/private key system overcomes the disadvantages of the prior art.

SUMMARY OF THE INVENTION

The method and system of the present invention comprises using the AUTACK or EDI acknowledgement message as a document to provide the digital signature in a public/private key system in which the AUTACK is signed by an encrypted hash code from the EDI interchange communication which has been encrypted with the sender's private key, such as in an RSA type public/private key system, and is an improvement on such systems. Because the AUTACK or functional acknowledgement is sealed with the private key of the sender of the functional acknowledgement, the recipient of the original message, when the original sender decrypts the reply AUTACK message with the recipient's public key, he is assured that the intended recipient actually sent the reply AUTACK or acknowledgement and of the integrity of the receipt due to the correct hash code being detected.

The EDI AUTACK message, such as the EDIFACT AUTACK message, a generic international standard of EDI for administration, commerce and trade, is preferably used to deliver the desired secure authentication, non-repudiation of origin or receipt, and acknowledgement or denial of acknowledgement for one or more EDI envelopes, such as the X.12 or EDIFACT envelopes, by way of example. In the presently preferred method and system of the present invention, in the process of authentication and non-repudiation of origin, the sender computes a desired hush or message digest from the EDI, such as the MD5 for the entire EDI interchange communication, and inserts the value in the AUTACK message. The sender then preferably computes the MD5 (message digest version 5) of the AUTACK message and digitally signs the AUTACK by encrypting the computed MD5 with the sender's private key, and inserts this value in the AUTACK message. Thus, the AUTACK, or EDI acknowledgement message, is preferably used to provide the signature. The recipient, after receipt of the message, then decrypts the EDI interchange communication, if it is encrypted, and computer the MD5 of the received EDI interchange communication. If non-repudiation of origin is desired, the recipient then decrypts the AUTACK message with the sender' public key. The value obtained by this decryption in this example is the MD5 of the AUTACK message. The MD5 of the AUTACK message is then computed and compared with the decrypted value. If both values are equal, the integrity of the AUTACK is verified and non-repudiation of origin is established. The MD5 of the EDI interchange communication is then compared with the MD5 of the EDI interchange which had been inserted in the AUTACK and if the two are equal, then the integrity of the EDI interchange is verified, and non-repudiation of origin is established.

In order to then establish non-repudiation of receipt, after verifying the integrity and authenticity of the EDI interchange communication received in the manner described above, a new or reply AUTACK is created by populating all segments and elements as appropriate, the computed MD5 is digitally signed with the receiver's private key, the digitally signed MD5 is inserted into the reply AUTACK, appropriate segments of the reply AUTACK are populated, and the prepared reply AUTACK is transmitted to the sender. The original sender, upon receiving this reply AUTACK, then verifies the digital signature from the recipient of his original message by decrypting it with the receiver's public key. The value obtained by this decryption is the MD5 of the received reply AUTACK. The original sender, who has received the reply AUTACK from the recipient of his message, then computes the MD5 of the received reply AUTACK and if the computed MD5 is equal to the decrypted MD5, the integrity of the AUTACK is preserved and non-repudiation of origin of the AUTACK is established. Moreover, if the MD5 contained in the particular segment of the AUTACK received where it has been inserted by the sender is equal to the MD5 of the EDI interchange previously transmitted and the acknowledgement is positive, which can be inferred by testing the security code in the AUTACK message, then the following are implicit to establish non-repudiation of receipt: the EDI interchange communication in question is known to both sender and receiver because the MD5 of the EDI interchange communication and the interchange number are contained in the AUTACK message and have been duly recognized, the integrity and authenticity of the EDI interchange communication upon receipt has been verified, and the receiver does not deny having received the EDI interchange communication in question.

The ability to trade or conduct business on a peer-to-peer basis over an open public network, such as the INTERNET, without the need for password management may be controlled, to the extent desired, by the trading participants through the use of trading partner agreements to provide key exchange certification, or by reliance on a certificate authority which issues and verifies public/private key paths. Thus, private and secure transactions, subject to authentication and non-repudiation of both origin and receipt, along with verification of message integrity, using EDI, may be conducted over an open communication network.

BRIEF DESCRIPTION OF THE DRAWINGS

FIGS. 15–21 are diagrammatic illustrations, similar to FIG. 14, of typical computer screen displays in accordance with the TRADING PARTNERS PROFILE option in the screen display of FIG. 14;

FIGS. 22–28 are diagrammatic illustrations, similar to FIG. 14, of typical computer screen displays in accordance with the TRADING PARTNER AGREEMENTS option in the screen display of FIG. 14, with FIG. 28 illustrating the OUTBOUND RETRANSMISSION screen display for sending secure E-mail in accordance with the presently preferred method and system of the present invention;

FIGS. 29–33 are diagrammatic illustrations, similar to FIG. 14, of typical computer screen displays in accordance with the KEY MANAGEMENT option in the screen display of FIG. 14; and FIGS. 34–41 are diagrammatic illustrations, similar to FIG. 14, of typical computer screen displays in accordance with the TRACKING option in the screen display of FIG. 14, with FIGS. 35–38 illustrating tracking interchanges and FIGS. 39–41 illustrating tracking an audit log.

DETAILED DESCRIPTION OF THE PREFERRED EMBODIMENT

Figure 1:
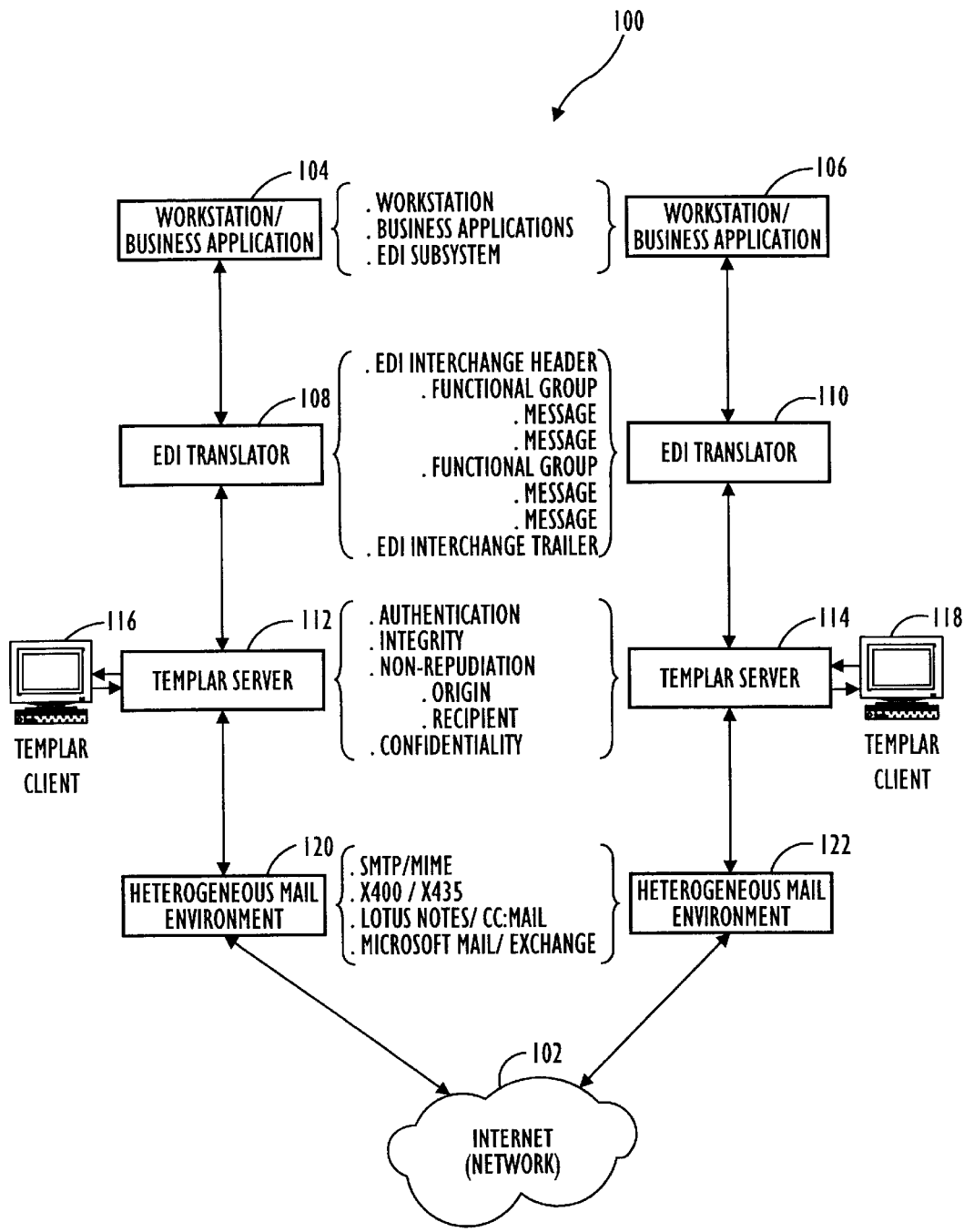
FIG. 1 is a functional flow diagram of the presently preferred method and system of the present invention for providing secure EDI over an open network, such as the INTERNET, in order to provide, integrity, authentication, non-repudiation of origin and recipient, and confidentiality using EDI.

Referring now to the drawings in detail, and initially to FIG. 1, a functional flow diagram of the presently preferred system 100 of the present invention for providing secure EDI over a conventional open network, such as the commercially available INTERNET 102, is shown. The preferred method and system of the present invention is implemented in a system which is provided under the trademark TEMPLAR owned by the assignee herein. As will be explained in greater detail hereinafter, with reference to FIGS. 2–41, the presently preferred method and system of the present invention provides integrity, authentication, non-repudiation of both origin and receipt, and confidentiality using EDI. This is preferably accomplished by using the AUTACK or EDI (Electronic Data Interchange) acknowledgement message as a document to provide a digital signature in a public/private key system, which is preferably one employing the conventional RSA public/private key encryption scheme, such as the encryption scheme described in U.S. Pat. Nos. 4,405,828; 4,424,414; 4,200,770; and 4,218,582, the contents of which are incorporated by reference herein in their entirety. As will be described in greater detail hereinafter, the AUTACK is preferably sealed or signed with a digital signature which is preferably created by encrypting the MD5 (message digest version 5) of the AUTACK with the originator of the AUTACK's private key, such as the private key of the sender in the preferred process of authentication and non-repudiation of origin illustrated in FIG. 2, or with the private key of the recipient in the preferred process of non-repudiation of receipt illustrated in FIG. 3. The digital signature is then preferably inserted into a predetermined position in the AUTACK and transmitted to the other party to the transaction. Because the AUTACK is sealed with the private key of the sender of the AUTACK, when the receiver of that AUTACK decrypts the AUTACK with the public key of the sender of that AUTACK, he is assured that the intended recipient of his message actually sent that AUTACK, as well as being assured of the integrity of the receipt due to the correct hash code being detected in the manner to be described hereinafter. In accordance with the present invention, the encrypted secret key used to encrypt the message, as well as the message ityself, are contained in the PKCS message.

The MD5 is a conventional value which can be obtained in an EDI message by conventionally hashing a quantity, such as an EDI interchange. There is a very low probability that the MD5 of any two different documents will be the same and, accordingly, the MD5 is preferably used to establish the integrity of EDI interchanges in accordance with the presently preferred method of the present invention.

As is well known by users of EDI, an AUTACK message is an UN/EDIFACT standard for authentication and acknowledgement. In accordance with the presently preferred method and system of the present invention, the AUTACK preferably consists of the USH or security header, USB, USX to identify the message, USY to hold security information on the referred message, USR, and a few other conventional segments normally found in an AUTACK. Preferably, information such as response type, scope of security application, and security function are coded in the USH segment. By way of example, the second element of the USH segment may preferably contain the value 2, or some other designated value, if the AUTACK were to serve as a document verifying non-repudiation of origin with, for example, the fifth field having the value 2, or some other designated value, if an acknowledgement were required. The USX segment preferably contains the interchange number of the EDI interchange in question, thereby linking the referred message to the AUTACK, and the USR segment preferably is a security result holder and contains the digitally signed MD5 of the AUTACK in accordance with the present invention.

As further shown and preferred in FIG. 1, assuming only a two party business transaction between two parties who have entered into a trading partner agreement, each of the parties has a conventional computer workstation 104, 106, such as a RS/6000, HP/9000 and a SOLARIS; a conventional EDI translator 108, 110; a conventional integrated software/hardware server 112, 114, which has been programmed to operate in accordance with the preferred method and system of the present invention, and which includes conventional computer display terminals 116, 118, capable of operating in a Microsoft WINDOWS or UNIX X-WINDOWS type environment, for displaying messages and choices in accordance with the preferred method of the present invention as well as messages and documents transmitted via EDI over the INTERNET network 102 in carrying out the method of the present invention, with the servers 112, 114 being capable of providing the desired authentication, integrity, non-repudiation of origin and receipt, and confidentiality in accordance with the present invention. As shown and preferred, the servers 112, 114 conventionally communicate over the open network, such as the INTERNET 102, through a heterogeneous mail environment 120, 122, such as one employing SMPT/MIME, X400/X435, LOTUS NOTES/cc:MAIL, and/or MICROSOFT MAIL/ EXCHANGE. The server 112, 114 are preferably conventional computers, which have been conventionally programmed in C++, to carry out the presently preferred method of the present invention, and are preferably targeted to run on on one of the following UNIX platforms: AIX, HPUX, SUN OS, or SOLARIS.

Enumerated below in TABLE A are the various scripts which may be readily used by a programmer of ordinary skill in the art to create the necessary programming in C++, which is an object oriented programming language, to run on the servers 112, 114 to carry out the presently preferred method of the present invention. As will be noted, the various scripts relate to sending an EDI document, re-sending an EDI document, receiving a valid EDI document, receiving an acknowledgement AUTACK, receiving a trading partner's new public key, distributing your new public key to related trading partners, activating the certificate management main menu, creating your own private/public key pair, changing a certificate (your own public/private key pair), removing your own private/public key pair, copying your own public key to disk file, printing your own public key certificate, saving your own private/ public key to disk file, restoring your own private/public key from disk file to replace the existing private/public key, restoring your own private/public key from disk file to a new key, activating the trading partner public key management main menu, adding a trading partner public key, changing the trading trading partner public key, removing the trading partner public key, copying the trading partner public key from disk file to replace the existing trading partner public key, copying the trading partner public key from disk file to a new key.activating the trading partner agreement management main menu, adding trading partner agreement, changing the trading partner agreement, removing the trading partner agreement, copying the trading partner agreement to disk file, copying the trading partner agreement from disk file, MIME packaging (conventional MIME mailer), MIME unpackaging, PKCS packaging (conventional PKCS), PKCS unpackaging, working with the tracking record, monitoring server jobs, receiving an invalid EDI document with an integrity problem, receiving an AUTACK with an integrity problem, receiving unsupported mail, receiving an EDI interchange without AUTACK while non-repudiation of origin is expected, and receiving an unexpected AUTACK.

TABLE A

| | Scripts | |
|---|---|---|
| Initiator | Action | Participant |
| Send an EDI document | | |
| EDI translator | Request to send an EDI batch | authentication agent |
| authentication agent | Get sender and receiver ID envelop | EDI interchange |
| authentication agent | Create a tracking record | tracking record |
| authentication agent | Create an event begin log entry | audit log |
| authentication agent | Request digest calculation method and trading partner's destination address, source address, method of non-repudiation of receipt (NRR), non-repudiation of origin (NRO), confidentiality and transfer | trading partner agreement |
| authentication agent | Get identification digest | EDI interchange |
| EDI interchange | Get identification digest method | configuration |
| EDI interchange | Calculate digest of the EDI interchange | digest calculator |

TABLE A-continued

Scripts

| Initiator | Action | Participant |
|---|---|---|
| authentication agent | Verify the control number and identification digest is unique | tracking list |
| authentication agent | Create AUTACK | AUTACK |
| AUTACK | Get the private key ID, NRR, NRO, integrity check, digest method | trading partner agreement |
| AUTACK | Get the private key | key directory |
| AUTACK | Get integrity digest | EDI interchange |
| AUTACK | Calculate own digest | digest calculator |
| AUTACK | Sign the digest of the AUTACK | BSAFE |
| authentication agent | Create AUTACK envelop | UNB envelop |
| authentication agent | Encrypt the EDI interchange | PKCS |
| authentication agent | Combine the EDI interchange and AUTACK into one MIME encoded mail body (multiple MIME partials | MIME packager |
| authentication agent | Send the encoded interchange to trading partner | sendmail |
| authentication agent | Update the tracking record with send date and time, location of the mail body, sender and receiver ID, NRO and integrity digest, private key ID, public key ID, identification digest | tracking record |
| authentication agent | Create a mail sent log entry | audit log |
| authentication agent | Return a success return code and tracking record ID to EDI translator | authentication agent |

Re-Send an EDI document

| Initiator | Action | Participant |
|---|---|---|
| re-transmit monitor | Request the acknowledge status | tracking record |
| re-transmit monitor | Request re-transmit action | trading partner agreement |
| re-transmit monitor | Request to re-send the EDI interchange | authentication agent |
| authentication agent | Request the location of the mail body | tracking record |
| authentication agent | Send the encoded interchange to trading partner | sendmail |
| authentication agent | Update the tracking record with re-send date and time | tracking record |
| authentication agent | Create a mail re-sent log entry | audit log |

Receive a valid EDI document

| Initiator | Action | Participant |
|---|---|---|
| MIME packager | Inform mail arrival | MIME packager |
| authentication agent | Create a mail received successfully log entry | audit log |
| authentication agent | Validate the received mail contained an EDI interchange | EDI interchange |
| authentication agent | Create a tracking record | tracking record |
| authentication agent | Get sender and receiver ID | EDI interchange envelop |
| authentication agent | Get trading partner agreement with sender and receiver ID | trading partner agreement |
| authentication agent | Get the digest of the interchange and signed digest, and digest calculation method | AUTACK |
| AUTACK | Get the public key ID | trading partner agreement |
| AUTACK | Get the public key of the trading partner | key directory |
| key directory | Read the latest effective public key | key directory |
| AUTACK | Decrypt the signed digest | BSAFE |
| authentication agent | Calculate digest of the EDI interchange | EDI interchange |
| authentication agent | Compare the calculated digest of the EDI interchange with the digest in the AUTACK, verify the digest of the partial AUTACK same as the decrypted signed digest in the AUTACK | AUTACK |
| authentication agent | Get identification digest | EDI interchange |
| EDI interchange | Get identification digest method | configuration |
| EDI interchange | Calculate digest of the EDI interchange | digest calculator |
| authentication agent | Verify the control number and identification digest is unique | tracking list |
| authentication agent | Create an EDI interchange received successfully log entry | audit tog |
| authentication agent | Get the non-repudiation of receipt flag | trading partner agreement |
| authentication agent | Create an acknowledge AUTACK, control number | AUTACK |
| AUTACK | Get the private key ID | trading partner agreement |
| AUTACK | Get the private key | key directory |
| AUTACK | Sign the digest | BSAFE |
| authentication agent | Create an AUTACK send request log entry | audit log |
| authentication agent | Create an AUTACK MIME encoded mail body | MIME packager |
| authentication agent | Send the encoded AUTACK to trading partner | sendmail |
| authentication agent | Update the tracking record with AUTACK send date and time, location of the mail body, sender and receiver ID digest | tracking record |
| authentication agent | Create an AUTACK sent log entry | audit log |
| authentication agent | Get inbound routing post-processing action | trading partner agreement |
| authentication agent | Write EDI data to specified file or directory | authentication agent |
| authentication agent | Execute post-processing command (e.g. invoke EDI translator) | authentication agent |

Receive an acknowledgement AUTACK

| Initiator | Action | Participant |
|---|---|---|
| MIME packager | Inform mail arrival | MIME packager |
| authentication agent | Get list of MIME body parts | MIME packager |
| authentication agent | Validate the received mail contained an AUTACK | AUTACK interchange |
| authentication agent | Get sender and receiver ID | AUTACK interchange envelope |
| authentication agent | Get NRR flag, public key ID | Trading partner agreement |
| authentication agent | Verify the sender's signature | BSAFE |
| authentication agent | Get interchange control number and integraty digest | AUTACK |
| authentication agent | Update acknowledge received date and time of the sent interchange | tracking record |

Receive a trading partner's new public key

| Initiator | Action | Participant |
|---|---|---|
| MIME packager | Inform mail arrival | MIME packager |
| authentication agent | Get list of MIME body parts | MIME packager |
| authentication agent | Validate the received mail contained a certificate | certificate |
| authentication agent | Get distinguish name, qualifier and ID of the trading partner | certificate |
| authentication agent | Get e-mail address of certificate management staff, public key | key directory |
| authentication agent | Verify the signature | BSAFE |
| authentication agent | Log certificate arrival | audit log |

TABLE A-continued

Scripts

| Initiator | Action | Participant |
|---|---|---|
| authentication agent | Create a tracking record with type certificate | tracking record |
| authentication agent | Inform the user the arrival of the certificate | authentication agent |
| User | Verify with trading partner that the certificate is correct | User |
| User | Select to update the certificate from the tracking record | User |
| UI | Get the certificate | tracking record |
| UI | Add the certificate with new serial number | key directory |
| UI | Change the expired date of previous certificate | key directory |
| UI | Log certificate update | audit log |
| UI | Change the status of the tracking record to updated | tracking record |
| Distribute new own public key to related trading partners | | |
| User | Invoke certificate management button | User |
| UI | Get a list of key pair - key ID | key directory |
| UI | Display the list of key pair on screen | UI |
| User | Select the certificate to distribute | User |
| User | Invoke the distribution function | User |
| UI | Get a list of trading partner using that certificate | trading partner agreement |
| UI | Get the e-mail address of the trading partner | trading partner |
| UI | Display the list of trading partner and e-mail address | UI |
| User | Select or de-select trading partner | User |
| User | Change the e-mail address | User |
| User | Add a new e-mail address | User |
| User | Invoke the distribution process | User |
| UI | Create the certificate (X.509 or PKCS?) | key directory |
| UI | Encode the certificate in MIME format | MIME packager |
| UI | Send the MIME encode certificate | sendmail |
| UI | Create a key sent log entry | audit log |
| Activate certificate management main menu | | |
| User | Invoke certificate management button | User |
| UI | Get a list of key pair - key ID | key directory |
| UI | Display the list of key pair on screen | UI |
| Create own private/public key pair | | |
| The user needs to logon and activate certificate management main menu before get to this function. | | |
| User | Invoke create key pair button | User |
| UI | Display a screen to accept key ID, effective date, distinguished name and e-mail address | UI |
| User | Key in the key ID, effective date, name and e-mail address | User |
| UI | Create key pair | key directory |
| key directory | Get length of the key | configuration |
| key directory | Get key generation seed | seed generator |
| key directory | Generate private and public key pair | BSAFE |
| key directory | Ensure the public key does not exist | key directory database |
| key directory | Get internal encryption key | configuration |
| key directory | Encrypt the private key | BSAFE |
| key directory | Assign 1 to the serial number | key directory |
| key directory | Write the key pair | key directory database |
| key directory | Return the key pair | key directory |
| UI | Update key list | UI |
| Change certificate (own private/public key pair) | | |
| The user needs to logon and activate certificate management main menu before get to this function. | | |
| User | Select a key pair for change | User |
| User | Invoke change certificate button | User |
| UI | Display a screen to change effective date, name and e-mail address | User |
| User | Change fields | User |
| User | Invoke the create new key button | User |
| UI | Re-generate the key pair | key directory |
| key directory | Assign new serial number | key directory |
| key directory | Get key generation seed | seed generator |
| key directory | Get length of key | configuration |
| key directory | Generate private and public key pair | BSAFE |
| key directory | Ensure the public key does not exist | key directory database |
| key directory | Get internal encryption key | configuration |
| key directory | Encrypt the private key | BSAFE |
| key directory | Write the new key pair | key directory database |
| key directory | Return the key pair | key directory |
| UI | Update key list | UI |
| Remove own private/public key pair | | |
| The user needs to logon and activate certificate management main menu before get to this function. | | |
| User | Select a key pair for removal | User |
| User | Invoke remove key pair button | User |
| UI | Check whether the key pair is used in any trading partner agreement | trading partner agreement |
| UI | Display the confirmation message | UI |
| User | Confirm to remove the key pair | User |
| UI | Remove the key pair | key directory |
| key directory | Deactivate the key pair | key directory database |
| UI | Mark the key pair as deactivated on screen | UI |
| Copy own public key to disk file | | |
| The user needs to logon and activate certificate management main menu before get to this function. | | |
| User | Select a key | User |
| User | Invoke the copy to disk function | User |
| UI | Display a screen to prompt for the output file name | UI |
| User | Key in the file name | User |
| UI | Display a replacement confirmation screen | UI |
| User | Select to overwrite the existing file | User |
| UI | Output the certificate in X.509 format to disk file | key directory |
| UI | Display a completion message | UI |
| UI | Redisplay the list | UI |
| Print own public key certificate | | |
| The user needs to logon and activate certificate management main menu before get to this function. | | |
| User | Select a key | User |
| User | Invoke the print certificate function | User |
| UI | Get the human readable formated certificate | key directory |
| key directory | Format the distinguished name, public key, effective date, reference (key ID), serial number, signature algorithm, certificate signature, version, issuer and e-mail address | key directory |
| UI | Output the certificate to the system default printer | UI |
| UI | Redisplay the list | UI |
| Save own private/public key to disk file | | |
| The user needs to logon and activate certificate management main menu before get to this function. | | |
| User | Select a key | User |
| User | Invoke the save to disk function | User |
| UI | Display a screen to prompt for the output file name | UI |
| User | Key in the file name | User |
| UI | Display a replacement confirmation screen | UI |
| User | Select to overwrite the existing file | User |

TABLE A-continued

Scripts

| Initiator | Action | Participant |
|---|---|---|
| UI | Output the key pair - distinguished name, private, public key, effective date, reference (key ID), serial number, digest algorithm, digest, version, issuer and e-mail address to file | key directory |
| UI | Display a completion message | UI |
| UI | Redisplay the list | UI |

Restore own private/public key from disk file to replace the existing
The user needs to logon and activate certificate management main menu before get to this function.

| Initiator | Action | Participant |
|---|---|---|
| User | Select a key | User |
| User | Invoke the restore from disk function | User |
| UI | Display a screen to prompt for the input file name | UI |
| User | Key in the file name | User |
| UI | Display a replacement confirmation and save the key pair screen | UI |
| User | Select to overwrite the existing key and key in the save file name | User |
| UI | Create a log entry | audit log |
| UI | Output the existing key pair - distinguished name, private, public key, effective date, reference (key ID), serial number, digest algorithm, digest, version, issuer and e-mail address to the save file | key directory |
| UI | Replace the key pair | key directory |
| key directory | Read in the key information from the file | key directory |
| key directory | Update the key information | database |
| UI | Display a completion message | UI |
| UI | Redisplay the list | UI |

Restore own private/public key from disk file to a new key
The user needs to logon and activate certificate management main menu before get to this function.

| Initiator | Action | Participant |
|---|---|---|
| User | Invoke the restore from disk function | User |
| UI | Display a screen to prompt for the key ID and input file name | UI |
| User | Key in the key ID and file name | User |
| key directory | Read in the key information from the file | key directory |
| key directory | Calculate the certificate digest | digest calculator |
| key directory | Verify the digest match | key directory |
| key directory | Write the key information | database |
| UI | Add the key pair to the list | UI |
| UI | Redisplay the list | UI |

Activate trading partner public key management main menu

| Initiator | Action | Participant |
|---|---|---|
| User | Invoke trading partner key button | User |
| UI | Get a list of trading partner public key | key directory |
| UI | Display the list of trading partner public keys on screen | UI |

Add trading partner public key
The user needs to logon and activate trading partner public certificate management main menu before get to this function.

| Initiator | Action | Participant |
|---|---|---|
| User | Invoke the add trading partner public key button | User |
| UI | Display add trading partner public key screen | UI |
| User | Select to add the key from a disk file | User |
| UI | Display a screen for keying in the file name | UI |
| User | Key in the file name | User |
| UI | Read in the e-mail address, effective date, public key, phone number, street address | public key file |
| UI | Display the public key | UI |
| User | Key in the trading partner company name | User |
| UI | Display the new public key in the list on screen | UI |

Change trading partner public key
The user needs to logon and activate trading partner public certificate management main menu before get to this function.

| Initiator | Action | Participant |
|---|---|---|
| User | Select a public key for change | User |
| User | Invoke the change public key button | User |
| UI | Get the public key informatoin | key directory |
| UI | Display trading partner public key on screen | UI |
| User | Change the effective date and public key | User |
| UI | Update the public key | key directory |
| UI | Add the new public key with new serial number | key directory |
| UI | Display the new public key in the list on screen | UI |

Remove trading partner public key
The user needs to logon and activate trading partner public certificate management main menu before get to this function.

| Initiator | Action | Participant |
|---|---|---|
| User | Select a public key for removal | User |
| User | Invoke the remove public key button | User |
| UI | Get the public key informatoin | key directory |
| UI | Display add trading partner public key screen | UI |
| UI | Display the confirmation screen | UI |
| User | Confirm the removal | User |
| UI | Deactivate the public key | key directory |
| UI | Remove the public key from the list on screen | UI |

Copy trading partner public key from disk file to replace the existing
The user needs to logon and activate certificate management main menu before get to this function. Assume the file is in X.509 format.

| Initiator | Action | Participant |
|---|---|---|
| User | Select a public key | User |
| User | Invoke the restore from disk function | User |
| UI | Display a screen to prompt for the input file name | UI |
| User | Key in the file name | User |
| UI | Display a replacement confirmation and save the key pair screen | UI |
| User | Select to overwrite the existing key and key in the save file name | User |
| UI | Create a log entry | audit log |
| UI | Output the existing key - distinguished name, public key, effective date, reference (key ID), serial number, digest algorithm, digest, version, issuer and e-mail address to the save file | key directory |
| UI | Replace the key | key directory |
| key directory | Read in the key information from the file | key directory |
| key directory | Update the key information | database |
| UI | Display a completion message | UI |
| UI | Redisplay the list | UI |

Copy trading partner public key from disk file to a new key
The user needs to logon and activate certificate management main menu before get to this function. Assume the file is in X.509 format.

| Initiator | Action | Participant |
|---|---|---|
| User | Invoke the restore from disk function | User |
| UI | Display a screen to prompt for the key ID and input file name | UI |
| User | Key in the key ID and file name | User |
| key directory | Read in the key information from the file | key directory |
| key directory | Calculate the certificate digest | digest calculator |
| key directory | Verify the digest match | key directory |
| key directory | Write the key information | database |
| UI | Add the key to the list | UI |
| UI | Redisplay the list | UI |

TABLE A-continued

Scripts

| Initiator | Action | Participant |
|---|---|---|
| Activate trading partner agreement management main menu | | |
| User | Invoke trading partner agreement button | User |
| UI | Get a list of trading partner agreement | trading partner agreement list |
| UI | Display the list of trading partner agreement on screen | UI |
| Add trading partner agreement | | |
| The user needs to logon and activate trading partner management main menu before get to this function. | | |
| User | Invoke the add trading partner agreement button | User |
| UI | Display trading partner agreement screen to accept local trading partner and certificate ID; remote trading partner and certificate ID | UI |
| User | Invoke add new local trading partner | User |
| UI | Display an add trading partner screen | UI |
| User | Key in name, contact, contact e-mail address, phone fax, address, full name, comment | User |
| UI | Verify the trading partner does not exist | trading partner list |
| UI | Add the trading partner | trading partner list |
| UI | Display the local trading partner on screen | UI |
| User | Key in envelop type, seperators, qualifier and ID | User |
| User | Invoke add new remote trading partner | User |
| UI | Display an add trading partner screen | UI |
| User | Key in name, contact, contact e-mail address, phone, fax, address, full name, comment | User |
| UI | Verify the trading partner does not exist | trading partner list |
| UI | Add the trading partner | trading partner list |
| UI | Display the remote trading partner on screen | UI |
| User | Invoke the inbound routing button | User |
| UI | Display inbound routing information screen | UI |
| User | Key in inbound information-status; security - NRO, NRR, and confidential; file to receive EDI data: command to run after receiving | User |
| UI | Verify inbound routing information | inbound routing |
| UI | Add inbound routing | inbound routing |
| User | Invoke the outbound routing button | User |
| UI | Display outbound routing information screen | UI |
| User | Key in transport information - MIME receiver and sender e-mail address, maximum message size, character set | User |
| User | Key in security - NRO, NRR, confidential | User |
| User | Key in re-transmission interval and action | User |
| UI | Verify outbound routing information | outbound routing |
| UI | Acid outbound routing | outbound routing |
| UI | Re-display the trading partner agreement main screen | UI |
| User | Select to save the trading partner agreement | User |
| UI | Add the trading partner agreement | trading partner agreement list |
| Change trading partner agreement | | |
| The user needs to logon and activate trading partner management main menu before get to this function. | | |
| User | Select trading partner agreement for change | User |
| User | Invoke the change trading partner agreement button | User |
| UI | Get the selected trading partner agreement | trading partner agreement list |
| UI | Get information - local and remote trading partner, inbound and outbound information | trading partner agreement |
| UI | Display trading partner agreement information on screen and do not allow to change the local and remote trading partner | UI |
| User | Request to change the local trading partner information | User |
| UI | Get information about the local trading partner | trading partner |
| UI | Display the trading partner information on screen | UI |
| User | Change e-mail address of the trading partner | User |
| UI | Update the trading partner | trading partner |
| UI | Display the trading partner agreement screen | UI |
| User | Select to change remote the trading partner | UI |
| UI | Get information about the remote trading partner | trading partner |
| UI | Display the trading partner information on screen | UI |
| UI | Display the trading partner agreement screen | UI |
| User | Change the address of the trading partner | User |
| UI | Update the trading partner | trading partner |
| UI | Display the trading partner agreement screen | UI |
| User | Change the inbound and outbound routing information | User |
| User | Select to update the trading partner agreement | User |
| UI | Update the trading partner agreement | trading partner list |
| Remove trading partner agreement | | |
| The user needs to logon and activate trading partner management main menu before get to this function. | | |
| User | Select a trading partner agreement for removal | User |
| User | Invoke the remove trading partner agreement button | User |
| UI | Get the selected trading partner agreement | trading partner agreement list |
| UI | Get information - local and remote trading partner | trading partner agreement |
| UI | Display trading partner agreement information on screen | UI |
| UI | Display the confirmation screen | UI |
| User | Confirm removal | User |
| UI | Remove trading partner agreement | trading partner agreement list |
| UI | Remove the agreement from the list on screen | UI |
| UI | Redisplay the new list on screen | UI |
| Copy trading partner agreement to disk file | | |
| The user needs to logon and activate trading partner agreement main menu before get to this function. | | |
| User | Select a trading partner agreement | User |
| User | Invoke the copy to disk function | User |
| UI | Display a screen to prompt for the output file name | UI |
| User | Key in the file name | User |
| UI | Display a replacement confirmation screen | UI |

TABLE A-continued

Scripts

| Initiator | Action | Participant |
|---|---|---|
| User | Select to overwrite the existing file | User |
| UI | Output the trading partner agreement to file as a flat file | trading partner agreement |
| UI | Display a completion message | UI |
| UI | Redisplay the list | UI |
| Copy trading partner agreement from disk file | | |
| The user needs to logon and activate trading partner agreement main menu before get to this function. | | |
| User | Invoke the copy from disk function | User |
| UI | Display a screen to prompt for the input file name | UI |
| User | Key in the file name | User |
| UI | Display a replacement confirmation screen | UI |
| User | Select to overwrite the existing trading partner agreement | User |
| UI | Replace the trading partner agreement | trading partner agreement |
| trading partner agreement | Read in the trading partner agreement information from the file | trading partner agreement |
| trading partner agreement | Update the trading partner agreement information | database |
| UI | Display a completion message | UI |
| UI | Redisplay the list | UI |
| MIME packaging | | |
| authentication agent | Create a MIME Object with EDI interchange, AUTACK, trading partner agreement | MIME packager |
| MIME packager | Get Sender's and Receiver's Qualifier and ID | EDI interchange |
| MIME packager | Get From and To e-mail address, maximum MIME partial size | trading partner agreement |
| MIME packager | Get trading partner security - encryption method (e.g. DES or RC4), trading partner public key ID, confidentiality flag | trading partner agreement |
| MIME packager | Envelope EDI interchange in PKCS envelope | PKCS enveloper |
| MIME packager | Create EDI body part for the PKCS-ed EDI interchange | MIME body part |
| MIME packager | Create AUTACK body part | MIME body part |
| MIME packager | Create MIME header - From and To e-mail address | MIME header |
| MIME packager | Create MIME-partials from MIME header and body parts | MIME message |
| MIME packager | Return the MIME message to authentication agent | MIME |
| MIME unpackaging | | |
| sendmail | Create MIME partial instance | MIME packager |
| MIME packager | Log partial arrival | audit log |
| MIME packager | Assemble partials | MIME packager |
| MIME packager | Log all partials received | audit log |
| MIME packager | Unwrap PKCS-ed body part | PKCS de-enveloper |
| MIME packager | Inform authentication agent mail arrival | MIME packager |
| authentication agent | Get From and To e-mail address | MIME packager |
| MIME packager | Get TP security | trading partner agreement |
| authentication agent | Get list of body parts | MIME message |
| authentication agent | Get AUTACK body part | MIME message |
| authentication agent | Get EDI interchange | MIME message |
| authentication agent | Continue with other processing | authentication agent |
| PKCS packaging | | |
| MIME packager | Create a PKCS-ed EDI interchange | PKCS packager |
| PKCS packager | Get sender's and receiver's qualifier and ID | EDI interchanger |
| PKCS packager | Get trading partner's public key ID and encryption method (e.g. DES or RC4) | Trading partner agreement |
| PKCS packager | Get trading partner's public key | key directory |
| PKCS packager | Get random DES key | DES encryptor |
| PKCS packager | Encrypt the EDI interchange | DES encryptor |
| PKCS packager | Encrypt the DES key | BSAFE |
| PKCS packager | Create the PKCS-ed MIME body part with the encrypted DES key and EDI interchange | MIME body part |
| PKCS packager | Return the PKCS-ed EDI interchange | PKCS packager |
| PKCS unpackaging | | |
| MIME packager | Unwrap a PKCS-ed body part | PKCS packager |
| PKCS packager | Get trading partner's public key ID | trading partner agreement |
| PKCS packager | Get trading partner's public key | key directory |
| PKCS packager | Match the certificate in the envelope to the certificate in the key directory | trading partner's public key |
| PKCS packager | Get the PKCS-ed EDI interchanger | PKCS-ed body part |
| PKCS packager | Decrypt the DES key | BSAFE |
| PKCS packager | Decrypt the encrypted EDI interchange | DES encryptor |
| PKCS packager | Return the EDI interchanger to MIME packager | PKCS packager |
| Work with tracking record | | |
| User | Invoke work with tracking record function | User |
| UI | Prompt for selection criteria - date range, sender/receiver, tracking record ID, status, data type, interchange control number (data type sensitive and only apply to EDI data) | UI |
| User | Key in criteria e.g. date range | User |
| UI | Get a list of tracking records which are within the specified date range | tracking record |
| tracking record | Query database | database |
| UI | Display a list of tracking records | UI |
| User | Invoke view detail of an EDI batch | User |
| UI | Get detail | tracking record |
| UI | Display the detail of the EDI batch | UI |
| User | Invoke the retransmition of an interchange | User |
| UI | Retransmit the interchange | authentication agent |
| UI | Redisplay the detail | UI |
| User | Close | User |
| UI | Redisplay the list of tracking record | UI |
| User | Select to retransmit an EDI batch | User |
| UI | Retransmit of the batch | authentication agent |
| UI | Redisplay the list of tracking record | UI |
| User | Reprocess an outbound batch | User |
| UI | Reprocess an outbound batch (start from beginning) | authentication agent |
| UI | Redisplay the list of tracking record | UI |
| User | Reprocess an inbound batch | User |
| UI | Reprocess an inbound batch (start from beginning) | authentication agent |
| UI | Redisplay the list of tracking record | UI |
| User | Continue from last action | User |

TABLE A-continued

Scripts

| Initiator | Action | Participant |
|---|---|---|
| UI | Continue last action | authentication agent |
| authentication agent | Get status | tracking record |
| authentication agent | Continue process according to the status | authentication agent |
| UI | Redisplay the list of tracking record | UI |
| User | Repeat last action of a success inbound batch i.e. retranslate | User |
| UI | Repeat last action | authentication agent |
| authentication agent | Get Status | tracking record |
| authentication agent | Repeat last action | authentication agent |
| UI | Redisplay the list of tracking record | UI |
| User | Select to print a group of tracking record | User |
| UI | Get tracking record summary information | tracking record |
| UI | Format the report | UI |
| UI | Print the report | printer |
| UI | Redisplay the list of tracking record | UI |
| User | Release a hold EDI batch | User |
| UI | Change the status of the tracking record to release | tracking record |
| UI | Process the EDI batch | authentication agent |
| UI | Redisplay the list of tracking record | UI |
| User | Select to display the content of a received mail. | User |
| UI | Get the mail content | tracking record |
| tracking record | Get the mail content | mail file |
| UI | Display the mail | UI |
| User | Close | User |
| UI | Redisplay the list of tracking record | UI |
| Monitor server jobs | | |
| User | Invoke work with monitor server jobs function | User |
| UI | Get server jobs information | operating system on the server |
| UI | Display the server job name, status | UI |
| User | Select to refresh the status | User |
| UI | Get server jobs information | operating system on the server |
| UI | Display the server job name, status | UI |
| User | Select to start a server job e.g. guardian | User |
| UI | Start the server job | job configuration |
| job configuration | Start the job | operating system on the server |
| UI | Get server jobs information | operating system on the server |
| UI | Display the server job name, status | UI |

Receive an invalid EDI document with integrity problem
Assume that the beginning of the script is same as the Receive a Valid EDI Document. After verifying the digest of the partial AUTACK same as the decrypted signed digest in the AUTACK, the Authentication Agent finds out that the digest in the AUTACK does not match the digest of the EDI interchange.

| authentication agent | Create an interchange integrity error log with following information: digest in AUTACK, digest of the EDI interchange, AUTACK control number, interchange control number, trading partner name, tracking record ID. | audit log |
| authentication agent | Update the status of the tracking record to interchange integrity error | tracking record |
| authentication agent | Get local e-mail address | trading partner agreement |
| authentication agent | Format an intechange integrity error e-mail with following information: time stamp, digest in AUTACK, digest of the EDI interchange, AUTACK control number, interchange control number, trading partner name, tracking record ID. | authentication agent |
| authentication agent | Send the e-mail | sendmail |
| authentication agent | Get EDI interchange creation date and time | EDI interchange |
| authentication agent | Format a negative AUTACK - the digest in the received AUTACK | AUTACK |
| authentication agent | Create an AUTACK interchange | AUTACK interchange |
| authentication agent | Encode the negative AUTACK in MIME format | MIME packager |
| authentication agent | Send the encoded negative AUTACK to trading partner | sendmail |
| authentication agent | Update the status of the tracking record to interchange integrity error with negative AUTACK sent | tracking record |
| authentication agent | Log the negative AUTACK sent event | audit log |

Receive an AUTACK with integrity problem
Assume that the beginning of the script is same as the Receive A Valid EDI Document. The Authentication Agent finds out that the digest of the partial AUTACK is not same as the decrypted signed digest in the AUTACK.

| authentication agent | Create an AUTACK integrity error log with following information: signed digest of the partial AUTACK in AUTACK, decrypted signed digest of the partial AUTACK in AUTACK, calculated digest of the partial AUTACK, AUTACK control number, trading partner name, trading partner's public key, tacking record ID. | audit log |
| authentication agent | Update the status of the tracking record to AUTACK integrity error | tracking record |
| authentication agent | Get local e-mail address | trading partner agreement |
| authentication agent | Format an AUTACK integrity error e-mail with following information: time stamp, signed digest of the partial AUTACK in AUTACK, decrypted signed digest of the partial AUTACK in AUTACK, calculated digest of the partial AUTACK, AUTACK control number, trading partner name, trading partner's public key, tracking record ID. | authentication agent |
| authentication agent | Send the e-mail | sendmail |

Receive unsupported mail
Assume that the beginning of the script is same as the Receive a Valid EDI Document. The Authentication Agent finds out that the mail is not an EDI document, not an AUTACK, and not a certificate.

| authentication agent | Dump the unsupported mail to a file. | dump file |
| dump file | Get the dump file directory | configuration |
| dump file | Generate an unique dump file name | dump file |
| dump file | Output the unsupported mail to the dump file | dump file |
| authentication agent | Create a received unsupported mail error log with following information: sender and receiver e-mail address, subject, e-mail message ID, dump file name. | audit log |

TABLE A-continued

Scripts

| Initiator | Action | Participant |
|---|---|---|
| authentication agent | Update the status of the tracking record to received unsupported mail, save the dump file name. | tracking record |
| authentication agent | Get local e-mail address | trading partner agreement |
| authentication agent | Format a received unsupported mail error e-mail with following information: sender and receiver e-mail address, subject, e-mail message ID, dump file name | authentication agent |
| authentication agent | Send the e-mail. | sendmail |

Receive an EDI interchange without AUTACK while non-repudiation of origin is expected
Assume that the beginning of the script is same as the Receive a Valid EDI Document. The Authentication Agent finds out that there is no AUTACK in the mail.

| authentication agent | Dump the EDI interchange to a file | dump file |
|---|---|---|
| dump file | Get the dump file directory | configuration |
| dump file | Generate an unique dump file name | dump file |
| dump file | Output the EDI interchange to the dump file | dump file |
| authentication agent | Create an AUTACK not received error log with following information: time stamp, interchage control number, trading partner name, tracking record ID, dump file name. | audit log |
| authentication agent | Update the status of the tracking record to AUTACK not received, save the dump file name | tracking record |
| authentication agent | Get local e-mail address | trading partner agreement |
| authentication agent | Format an AUTACK not received error e-mail with following information: time stamp, interchage control number, trading partner name, tracking record ID, dump file name. | authentication agent |
| authentication agent | Send the e-mail | sendmail |

Receive an unexpected AUTACK
Assume that the beginning of the script is same as the Receive a Valid EDI Document. The Authentication Agent finds out that there is an AUTACK in the mail but the trading partner agreement specifies no non-repudiation of origin.

| authentication agent | Dump the EDI interchange to a file | dump file |
|---|---|---|
| dump file | Get the dump file directory | configuration |
| dump file | Generate an unique dump file name | dump file |
| dump file | Output the EDI to the dump file | dump file |
| authentication agent | Dump the AUTACK interchange to a file | dump file |
| dump file | Get the dump file directory | configuration |
| dump file | Generate an unique dump file name | dump file |
| dump file | Output the AUTACK to the dump file | dump file |
| authentication agent | Create an unexpected AUTACK error log with following information: time stamp, interchage control number, trading partner name, tracking record ID, dump file names | audit log |
| authentication agent | Update the status of the tracking record to unexpected AUTACK, save the dump file names | tracking record |
| authentication agent | Get local e-mail address | trading partner agreement |
| authentication agent | Format an unexpected AUTACK error e-mail with following information: time stamp, interchage control number, trading partner name, tracking record ID, dump file names | authentication agent |
| authentication agent | Send the e-mail | sendmail |

Figure 14:
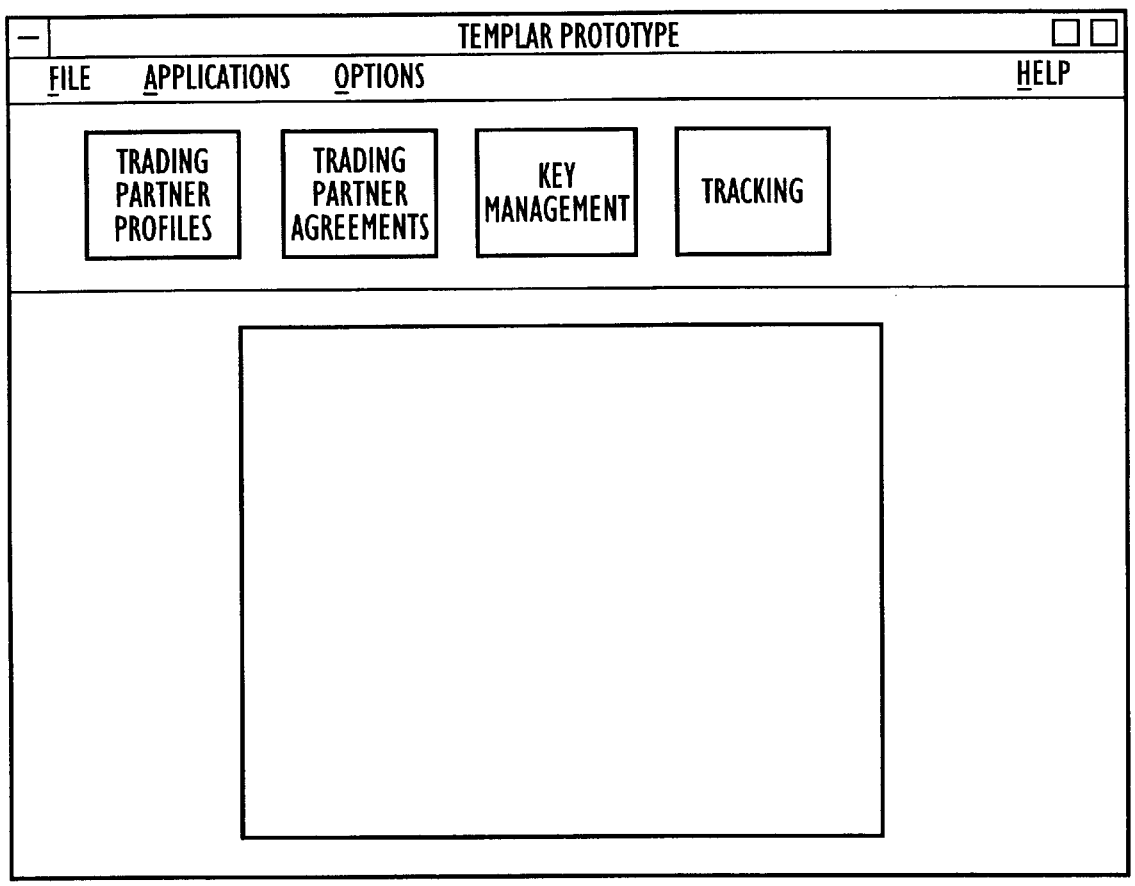
FIG. 14 is a diagrammatic illustration of a typical computer screen display in accordance with the presently preferred method and system of the present invention, illustrating the various functional options to be controlled by the users to ensure secure mail over the INTERNET in accordance with the presently preferred method and system of the present invention.

FIGS. 14–41 illustrate the various screen displays, in a conventional WINDOWS type environment, that are capable of being preferably provided on the typical computer screens 116, 118 associated with the servers 112, 114 in carrying out the above method under control of the program which is based on the scripts of TABLE A. In this regard, FIG. 14 illustrates the overall screen display which is presented to the parties on the network who are eligible to participate in peer to peer, computer to computer, business EDI transactions through the INTERNET. As shown by way of example in FIG. 14, the user may be presented, by way of example, with the choice to select windows for TRADING PARTNER PROFILES, TRADING PARTNER AGREEMENTS, KEY MANAGEMENT, and TRACKING in the conventional WINDOWS environment which is preferably employed.

Figure 18:
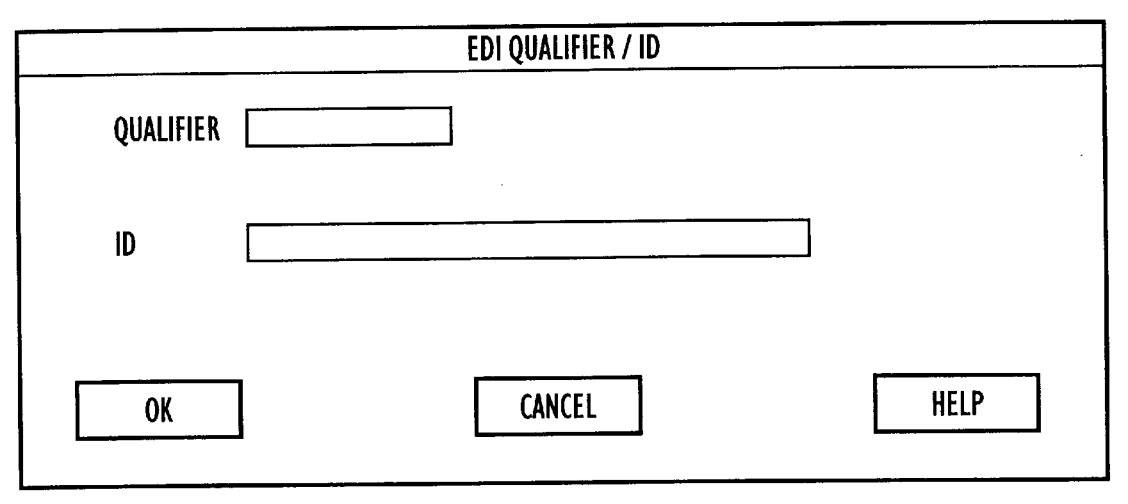
Figure 21:
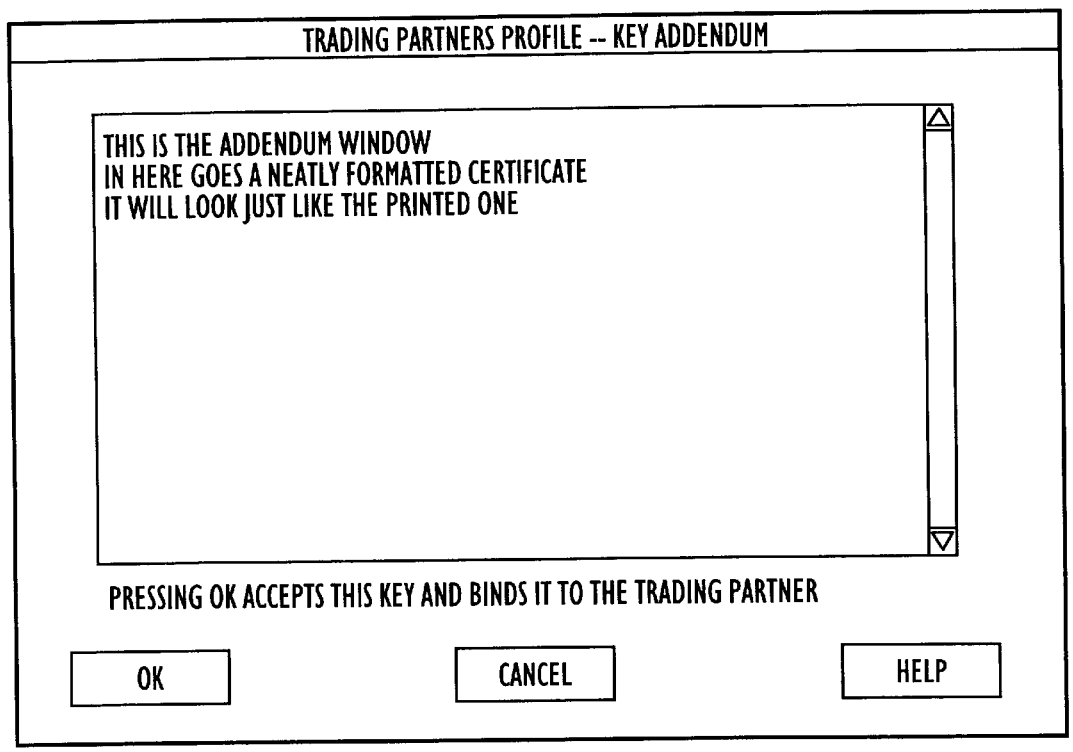

FIGS. 15–21 illustrate various computer screen displays which the user may be presented with after selecting the TRADING PARTNERS PROFILES window in the screen display of FIG. 14. FIG. 15 represents a scenario of three possible trading partners identified as CISCO, SEARS, and ME, where ME represents the user himself. FIG. 16 illustrates a possible dialog box for creating the trading partner profile directly on the computer screen 116, 118. Similarly, FIG. 17 illustrates a possible dialog box for creating contact information for the trading partner directly on the computer screen 116, 118. FIG. 18 illustrates a possible dialog box for creating EDI qualifier information directly on the computer screen 116, 118. FIG. 19 illustrates a possible dialog box for trading partner bound keys which are displayed and may be changed directly on the computer screen 116, 118, with two options for BIND and UNBIND being shown. FIG. 20 illustrates the computer screen display 116, 118 when the BIND KEYS option has been selected in the display of FIG. 19 in order to bind a particular key to a particular trading partner. FIG. 21 illustrates the computer screen display 116, 118 for KEY ADDENDUM for, by way of example, displaying a formatted certificate which may be bound to the trading partner along with the key.

Figure 24:
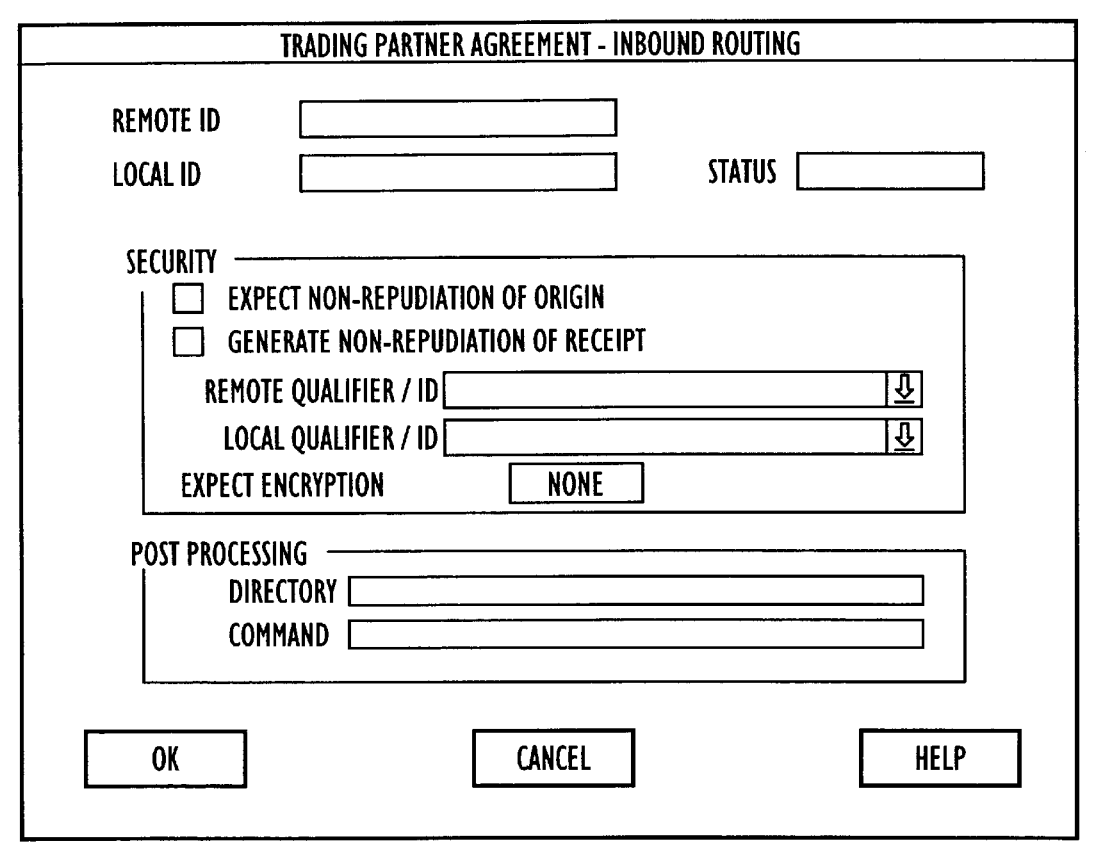
Figure 27:
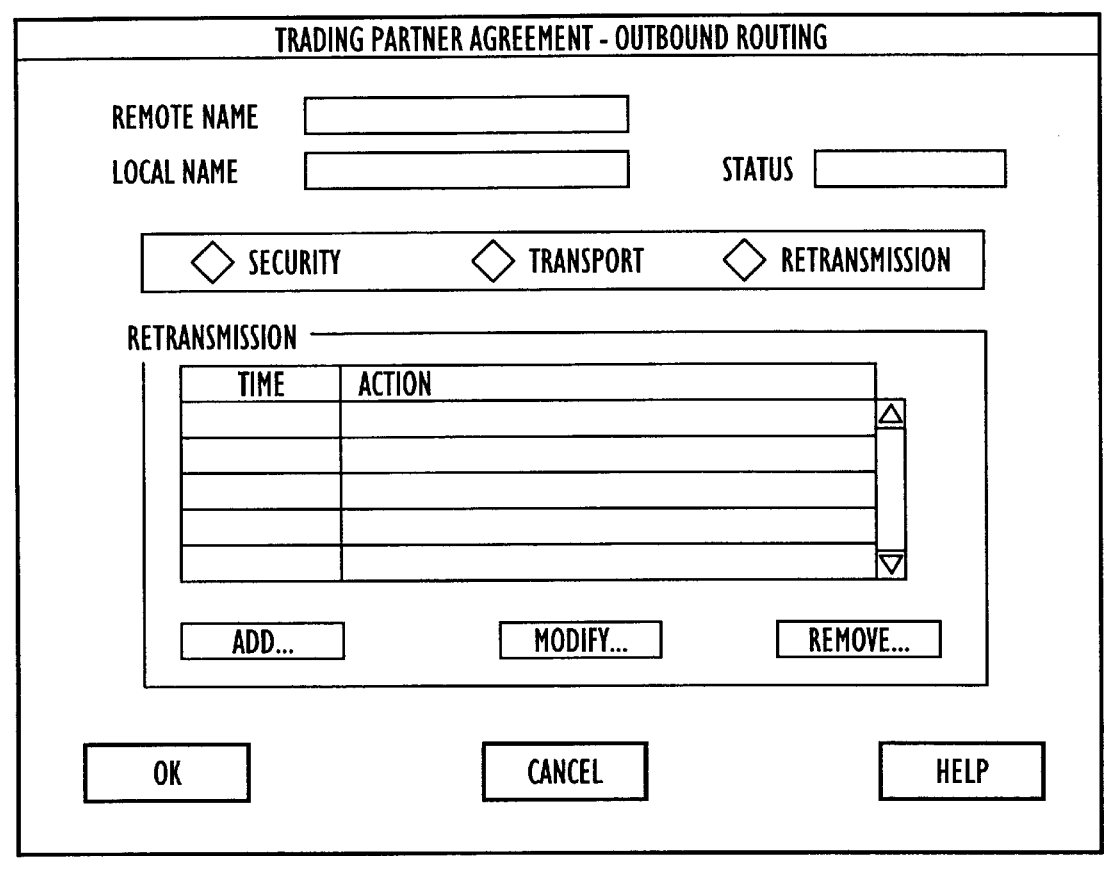
Figure 28:
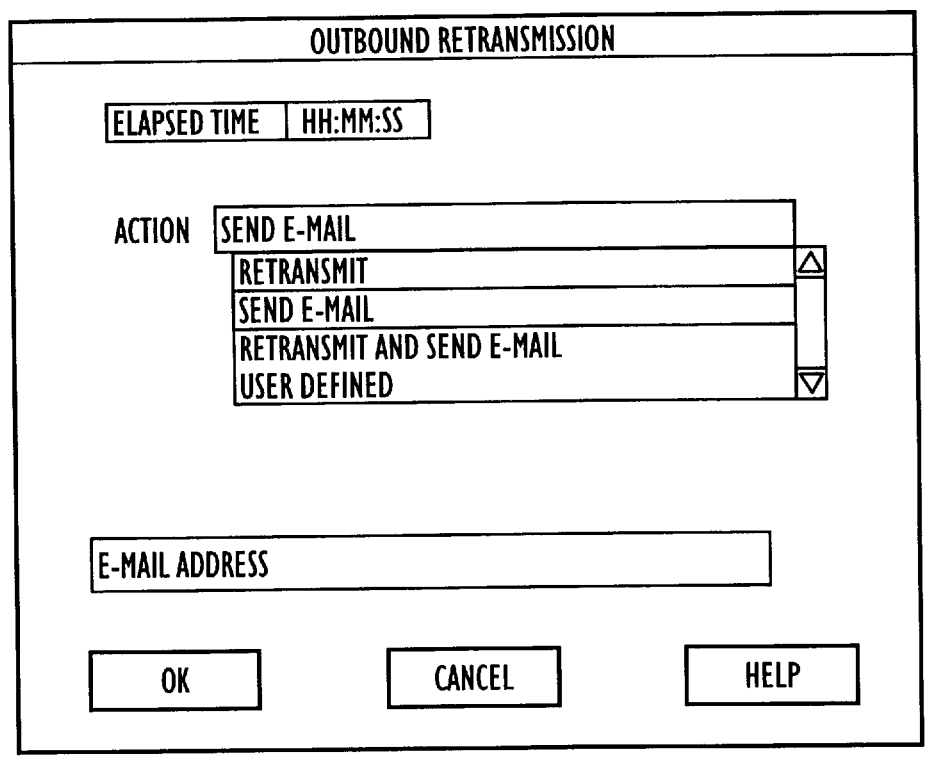

FIGS. 22–28 illustrate various computer screen displays which the user may be presented with after selecting the TRADING PARTNER AGREEMENTS window in the screen display of FIG. 14. FIG. 22 represents a scenario of the same three trading partners as identified in FIG. 15. FIG. 23 illustrates a dialog box for creating, in the above example, a trading partner agreement between the user ME, which is the local ID, and SEARS, which is the remote ID, directly on the computer screen 116, 118. FIG. 24 illustrates a dialog box for creating the inbound routing instructions for the trading partner agreement directly on the computer screen 116, 118. Similarly, FIGS. 25–27 illustrate various dialog boxes for creating the outbound routing instructions for the trading partner agreement directly on the computer screen 116, 118. FIG. 28 illustrates a dialog box for selecting the outbound retransmission directly on the computer screen 116, 118.

Figure 31:
Figure 32:
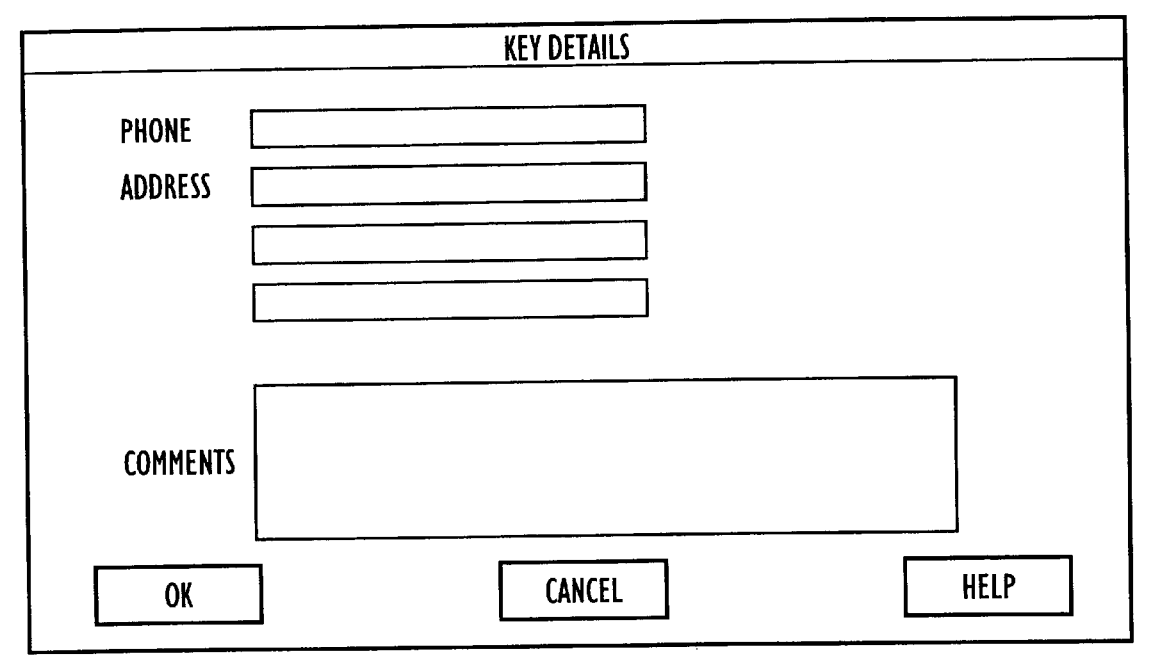

FIGS. 29–33 illustrate various computer screen displays which the user may be presented with after selecting the KEY MANAGEMENT window in the screen display of FIG. 14. FIG. 29 again represents a scenario of the same three trading partners as presented in FIG. 15. FIG. 30 illustrates a possible dialog box associated with the local key ID, FIG. 31 illustrates a possible dialog box associated with the remote key ID, FIG. 32 illustrates a possible dialog box associated with key details, and FIG. 33 illustrates a possible dialog box associated with export of the public key to another file.

Figure 34:
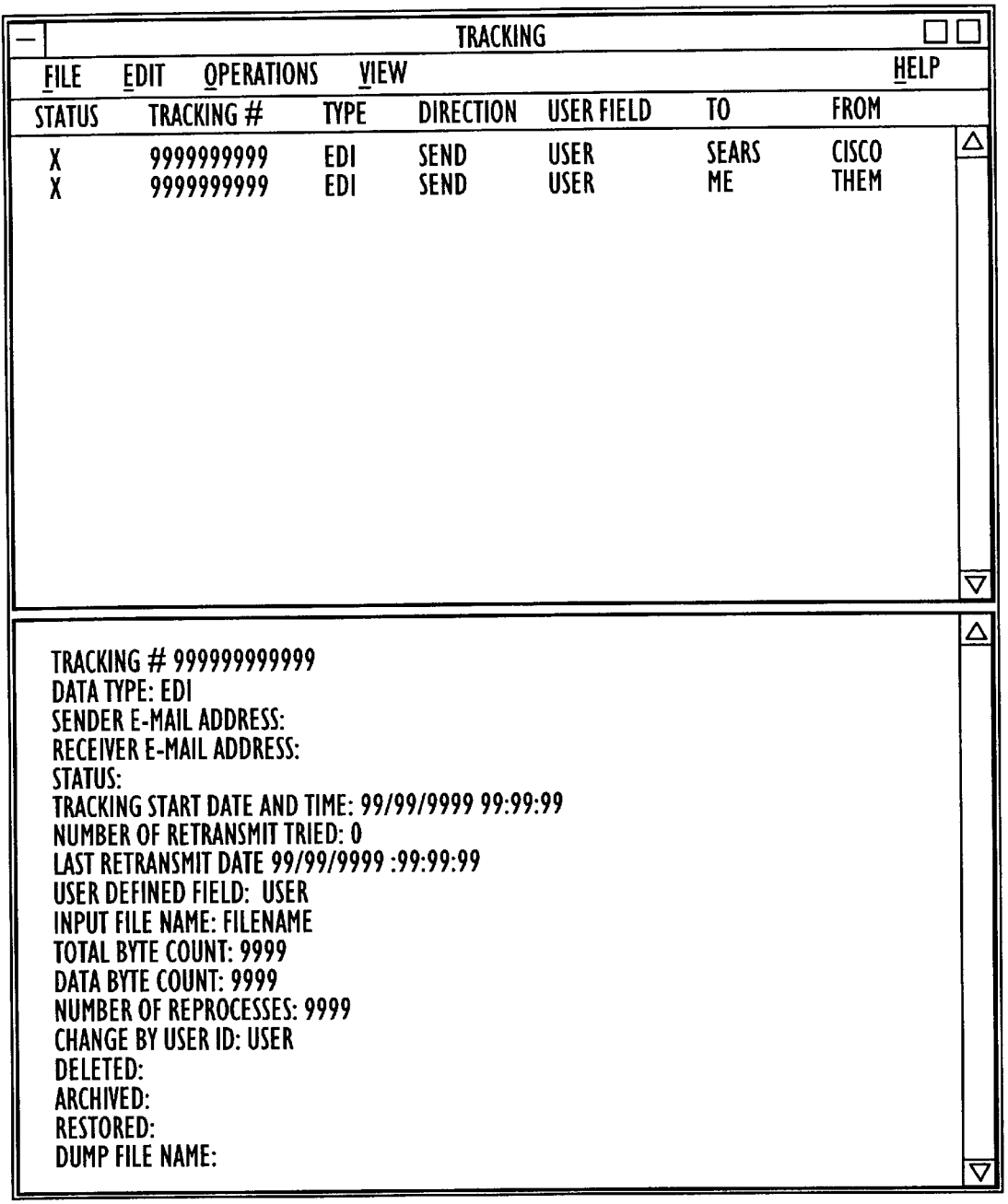
Figure 36:
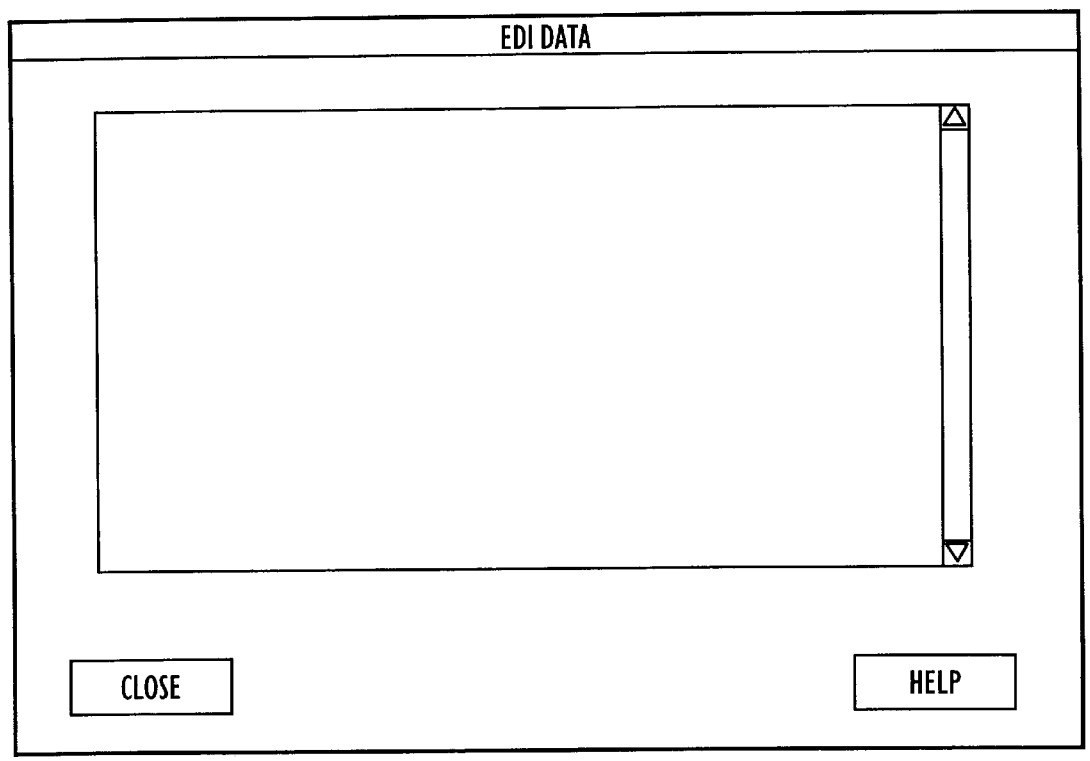
Figure 37:
Figure 38:
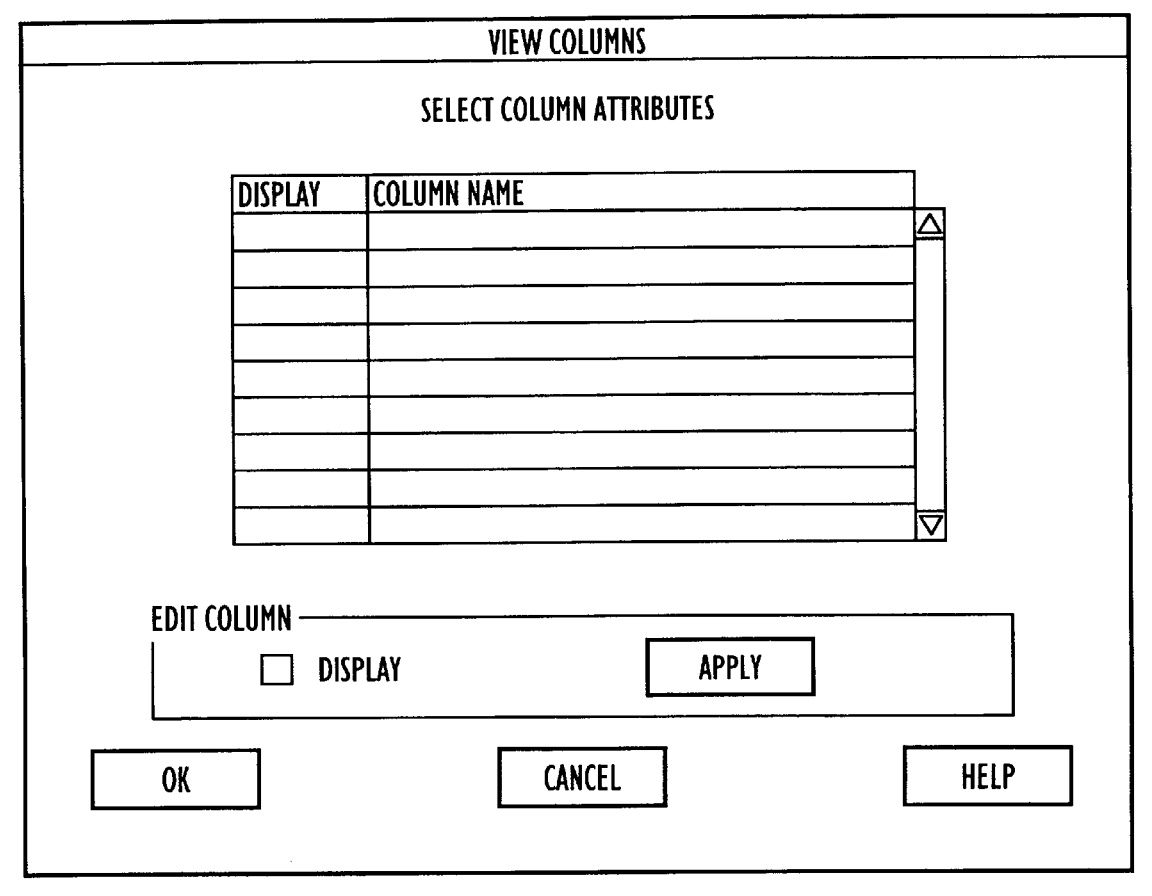
Figure 39:
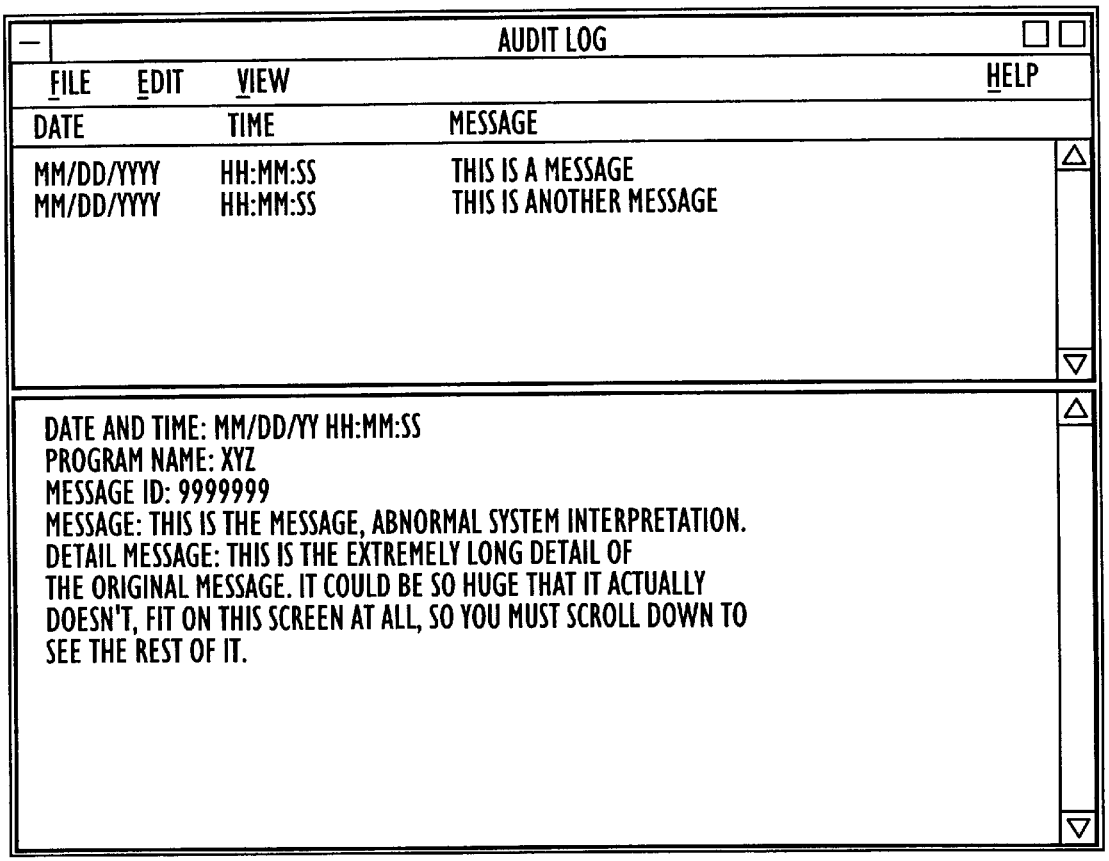

FIGS. 34–41 illustrate various computer screen displays which the user may be presented with after selecting the TRACKING window in the screen display of FIG. 14. FIG. 34 illustrates a screen display on the computer screen 116, 118 in which two EDI messages have been sent, one between SEARS and CISCO, and one between ME and THEM, by way of example. FIG. 35 illustrates a possible display on the computer screen 116, 118 of the interchanges between the trading partners and shows the non-repudiation of receipt AUTACK, illustrating the AUTACK status on the computer screen 116, 118 in accordance with the present invention. FIG. 36 illustrates a possible display on the computer screen 116, 118 of the EDI data after the VIEW EDI DATA dialog box has been selected in the screen display of FIG. 35. FIGS. 37–38 illustrate possible screen displays on the computer screen 116, 118 for selecting tracking criteria. FIG. 39 illustrates a possible screen display on the computer screen 116, 118 of an audit log, with FIGS. 40–41 illustrating possible screen displays on the computer screen 116, 118 for selecting audit log selection criteria.

Figure 2:
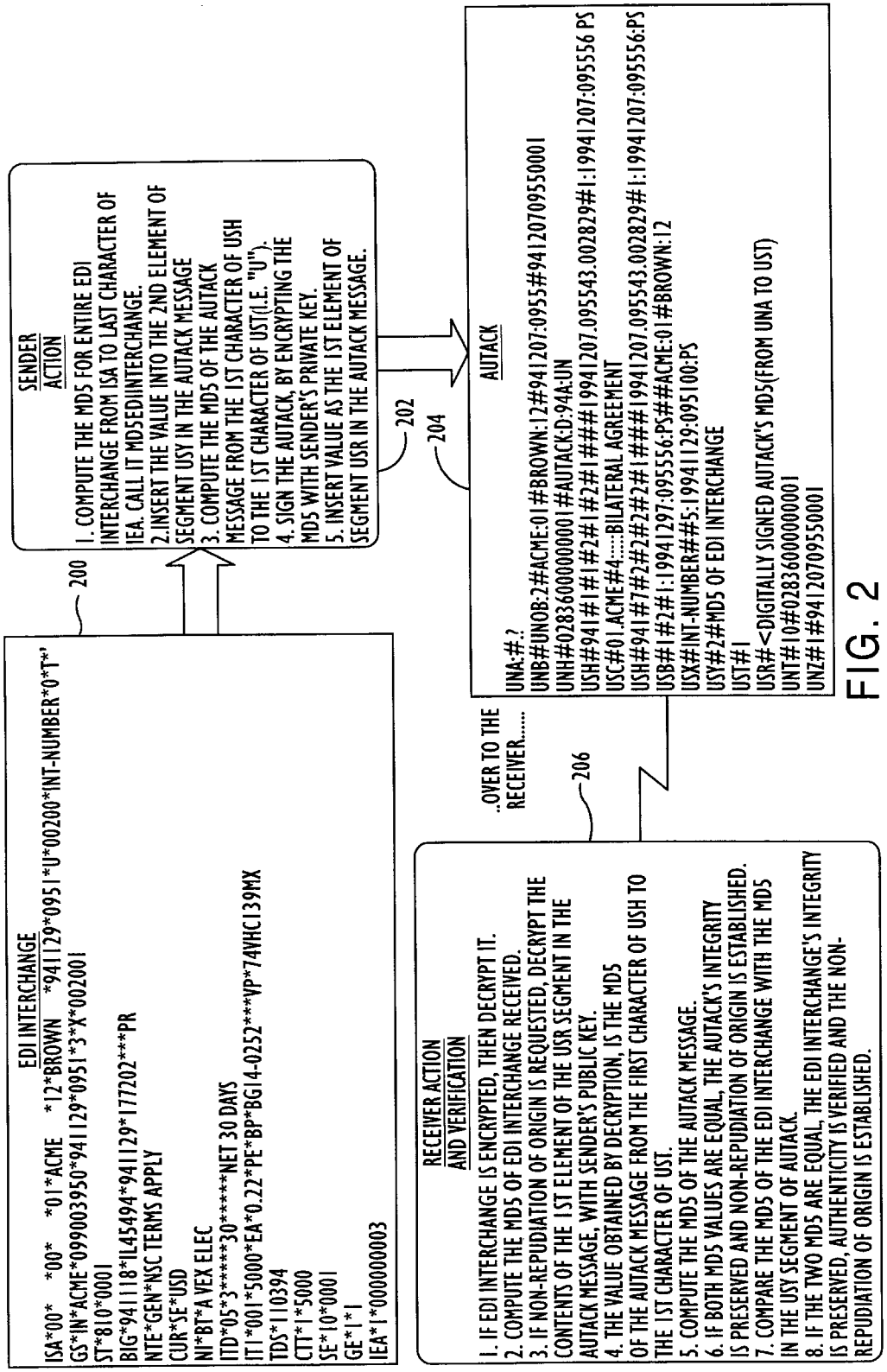
FIG. 2 is a functional flow diagram of the portion of the method and system of FIG. 1 which provides authentication and non-repudiation of origin using the EDIFACT AUTACK message.

Referring now to FIG. 2, the preferred process of authentication and non-repudiation of origin in accordance with the presently preferred method of the present invention shall now be described. As shown and preferred in FIG. 2, block 200 represents a typical EDI interchange in accordance with the present invention. Block 202 represents the preferred action of the server at the sender end with respect to this EDI interchange in accordance with the method of the present invention. As shown and preferred, the sender server preferably computes the MD5 for the entire EDI interchange, such as from ISA to the last character of IEA (termed MD5EDIINTERCHANGE). This value is then preferably inserted into a predetermined position in the AUTACK message, such as preferably the second element of segment USY in the AUTACK message. The sender server then preferably computes the MD5 of the AUTACK message, such as preferably from the first character of USH to the first character of UST. The sender server then preferably signs the AUTACK by encrypting the MD5 with the sender's private key. This computed value is then preferably inserted in a predetermined location in the AUTACK, such as preferably as the first element of segment USR in the AUTACK message. Block 204 represents a typical AUTACK message in accordance with the preferred method of the present invention after the sender server has taken the action illustrated in block 202. The AUTACK 204 is then preferably transmitted to the receiver server where the receiver action and verification illustrated in block 206 preferably takes place. If the EDI interchange is encrypted, then the receiver server preferably decrypts it and computes the MD5 of the received EDI interchange. Assuming that non-repudiation of origin is desired or requested, the receiver server then preferably, using the sender's public key, decrypts the contents of the first element of the USR segment in the AUTACK message 204, which is the location where the sender server has inserted the MD5 of the AUTACK. The value thus obtained by the decryption is the MD5 of the AUTACK message, in the above example, from the first character of USH to the first character of UST. The receiver server then preferably computes the MD5 of the AUTACK message and compares the computed MD5 with the value of the MD5 obtained by decrypting the contents of the first element of the USR segment in the AUTACK message. If both values of MD5 are equal, then the receiver server knows that the integrity of the AUTACK is preserved and non-repudiation of origin is established. The receiver server then preferably compares the MD5 of the EDI interchange with the MD5 in the USY segment of the AUTACK message, which is the location where the sender server has inserted the MD5 of the EDI interchange, and, if the two MD5 values are equal, the receiver server knows that the integrity of the EDI interchange is preserved, authenticity is verified, and non-repudiation of origin is established.

Figure 3:
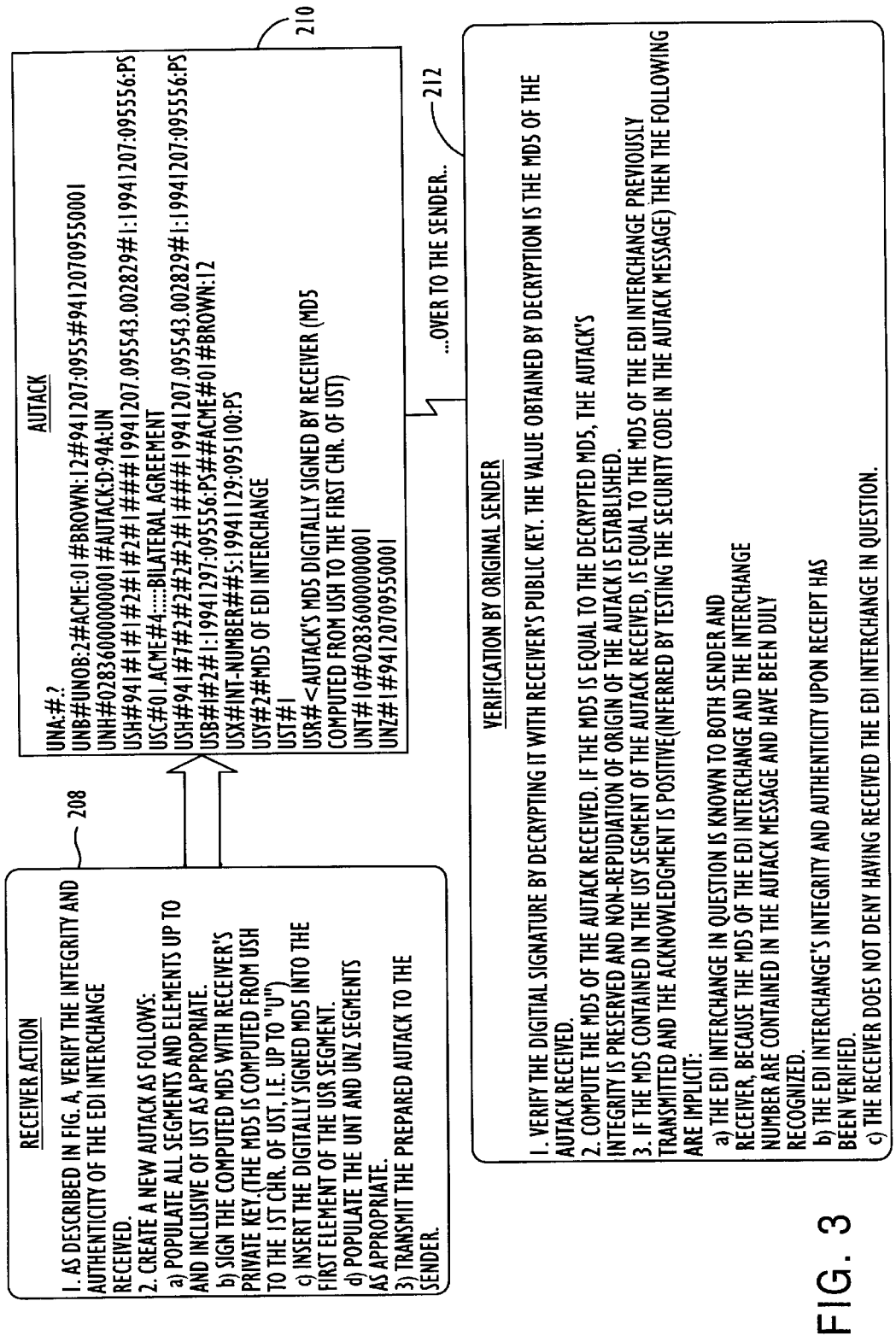
FIG. 3 is a functional flow diagram, similar to FIG. 2, of the portion of the method and system of FIG. 1 which provides non-repudiation of recipient using the EDIFACT AUTACK message.

Referring now to FIG. 3, the preferred process of non-repudiation of receipt in accordance with the presently preferred method of the present invention shall now be described. As shown and preferred in block 208, the action of the receiver server in verifying the integrity and authenticity of the EDI interchange received is preferably as described above with respect to block 206 of FIG. 2. Thereafter, the receiver server preferably creates a new AUTACK, such as the AUTACK message represented by block 210, and transmits the new AUTACK 210 to the sender server for verification by the original sender server, as represented by block 212. As shown and preferred in FIG. 3, in creating the new AUTACK, the reciver server preferably populates all segments and elements as appropriate, such as all segments and elements up to and inclusive of UST. The receiver server then preferably computes the MD5 of the new AUTACK, such as from USH to the first character of UST, and signs the computed MD5 with the receiver's private key. The receiver server then preferably inserts the digitally signed MD5 into a predetermined location in the new AUTACK, such as the first element of the USR segment. The receiver server then preferably populates the UNT and UNZ segments of the new AUTACK as appropriate and transmits the prepared new AUTACK to the original sender server. The original sender server then preferably verifies the digital signature of the received new AUTACK by decrypting it with the receiver's public key, with the value obtained by this decryption being the MD5 of the received new AUTACK. The original sender server then computes the MD5 of the received new AUTACK and compares it against the value of the MD5 obtained from the decryption process. If the two values of MD5 are the same, then the original sender server knows that the integrity of the new AUTACK is preserved and non-repudiation of origin of the new AUTACK is established. The original sender server also knows that if the MD5 contained in the USY segment of the received new AUTACK in the above example is equal to the MD5 of the EDI interchange previously transmitted and the acknowledgement is positive (such as preferably obtained by testing the security code in the new AUTACK message), then the EDI interchange in question is known to both sender and receiver because the MD5 of the EDI interchange and the interchange number are contained in the AUTACK message and have been duly recognized. In addition, the integrity and authenticity of the EDI interchange upon receipt has been verified and the receiver sender does not deny having received the EDI interchange in question.

Figure 4:
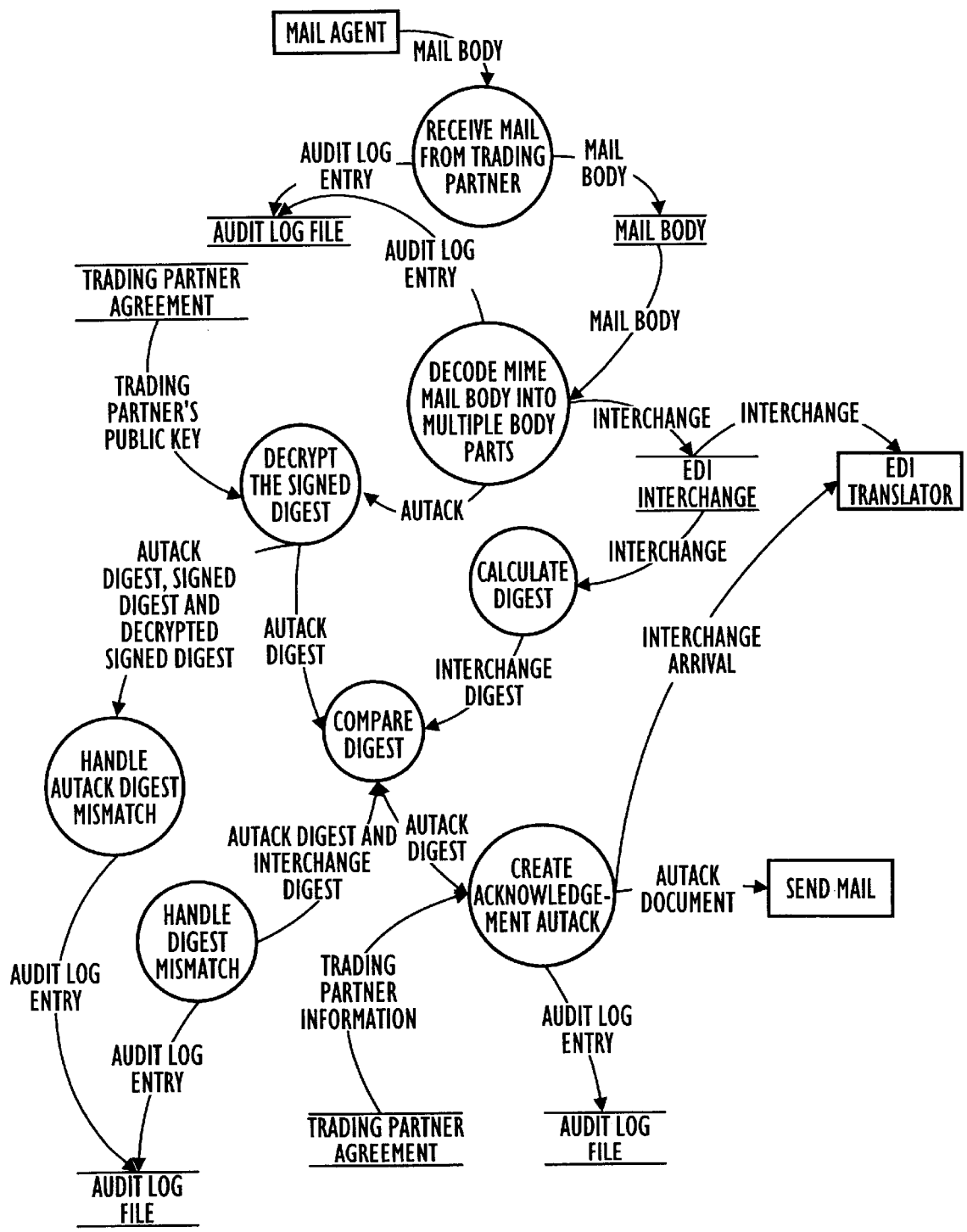
FIG. 4 is a functional flow diagram of the receipt of secure mail over the INTERNET in accordance with the presently preferred method and system of the present invention.
Figure 5:
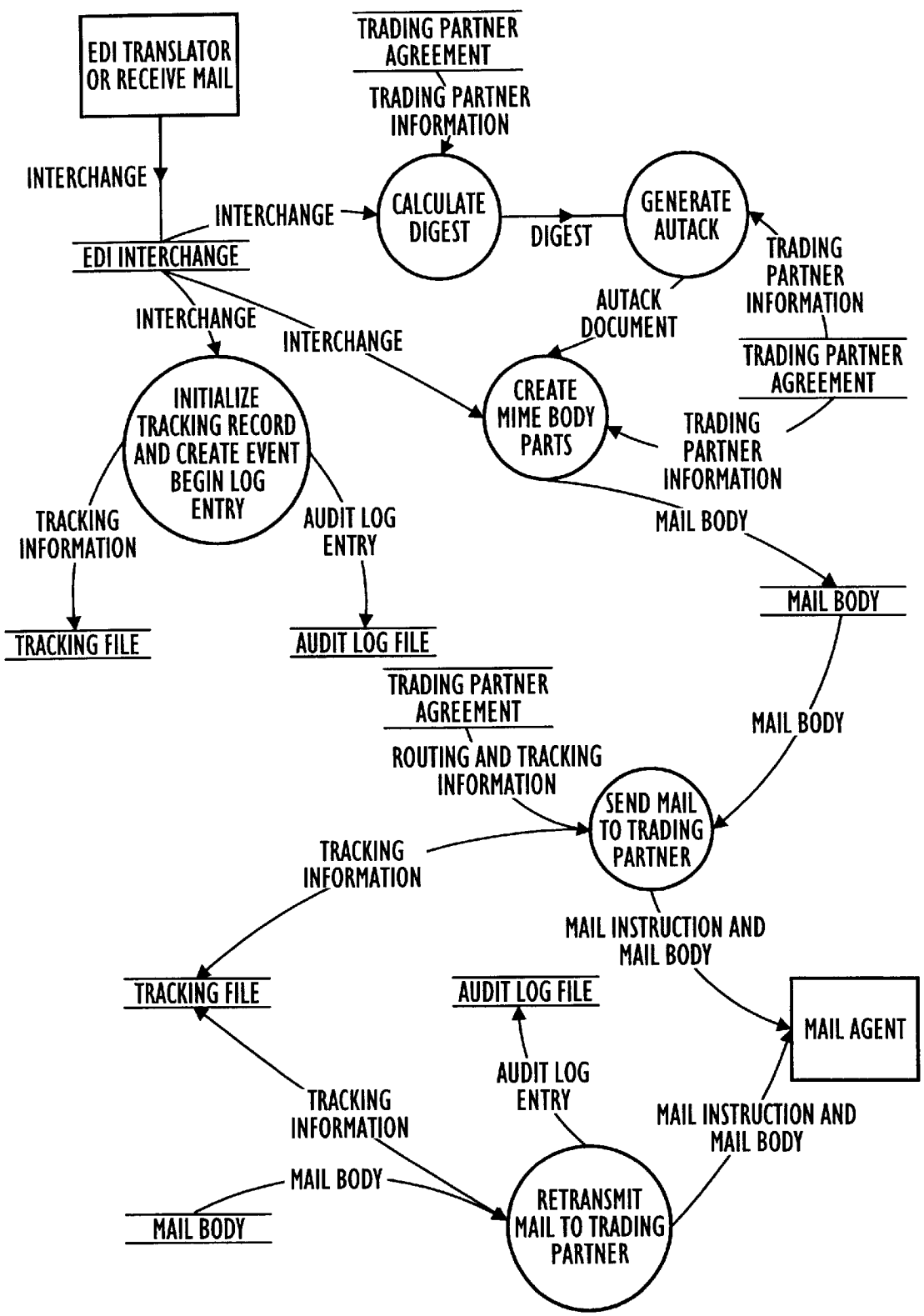
FIG. 5 is a functional flow diagram, similar to FIG. 4, of the sending of secure mail over the INTERNET in accordance with the presently preferred method and system of the present invention.
Figure 6:
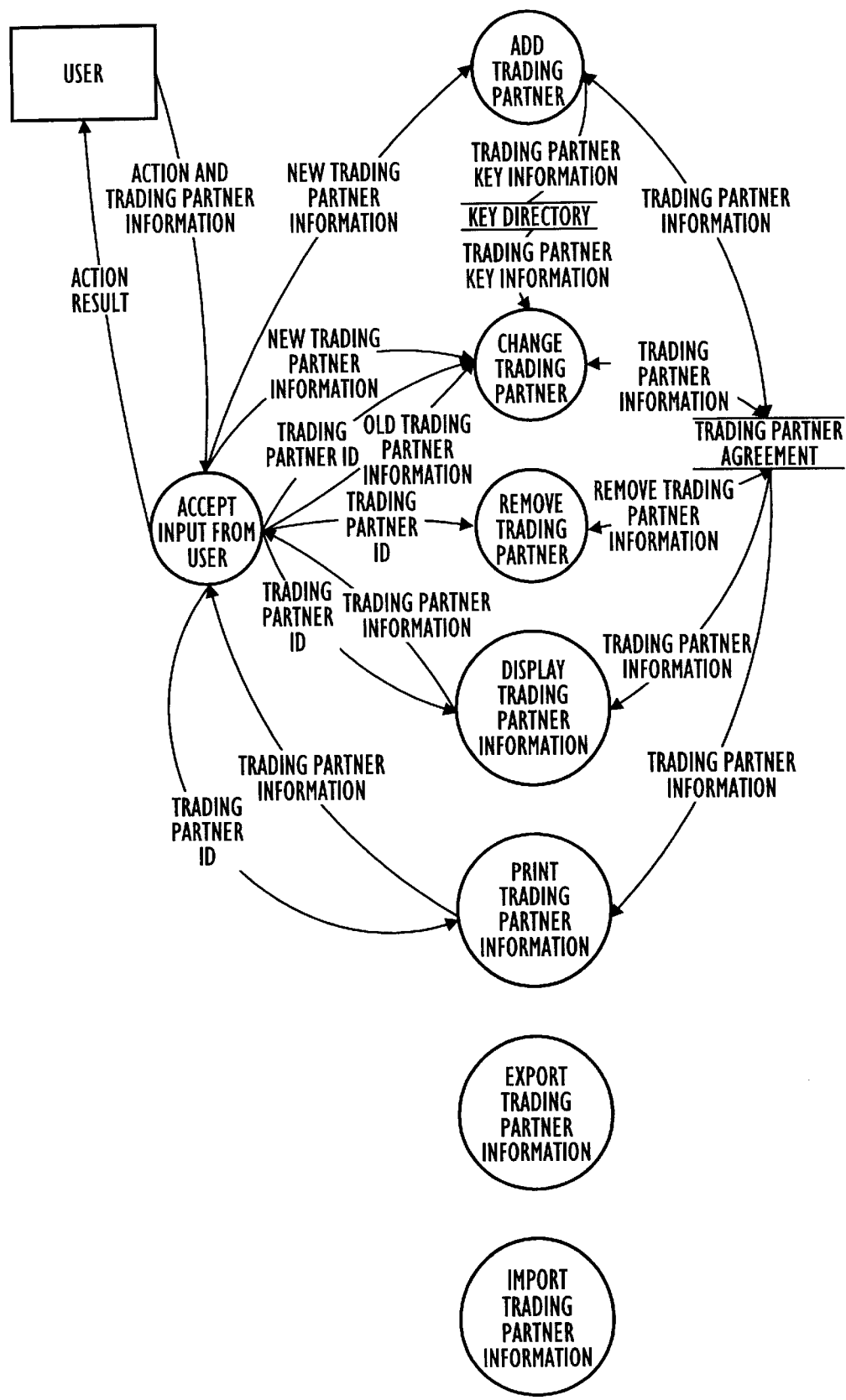
FIG. 6 is a functional flow diagram, similar to FIG. 4, of trading partner management in accordance with the presently preferred method and system of the present invention.
Figure 7:
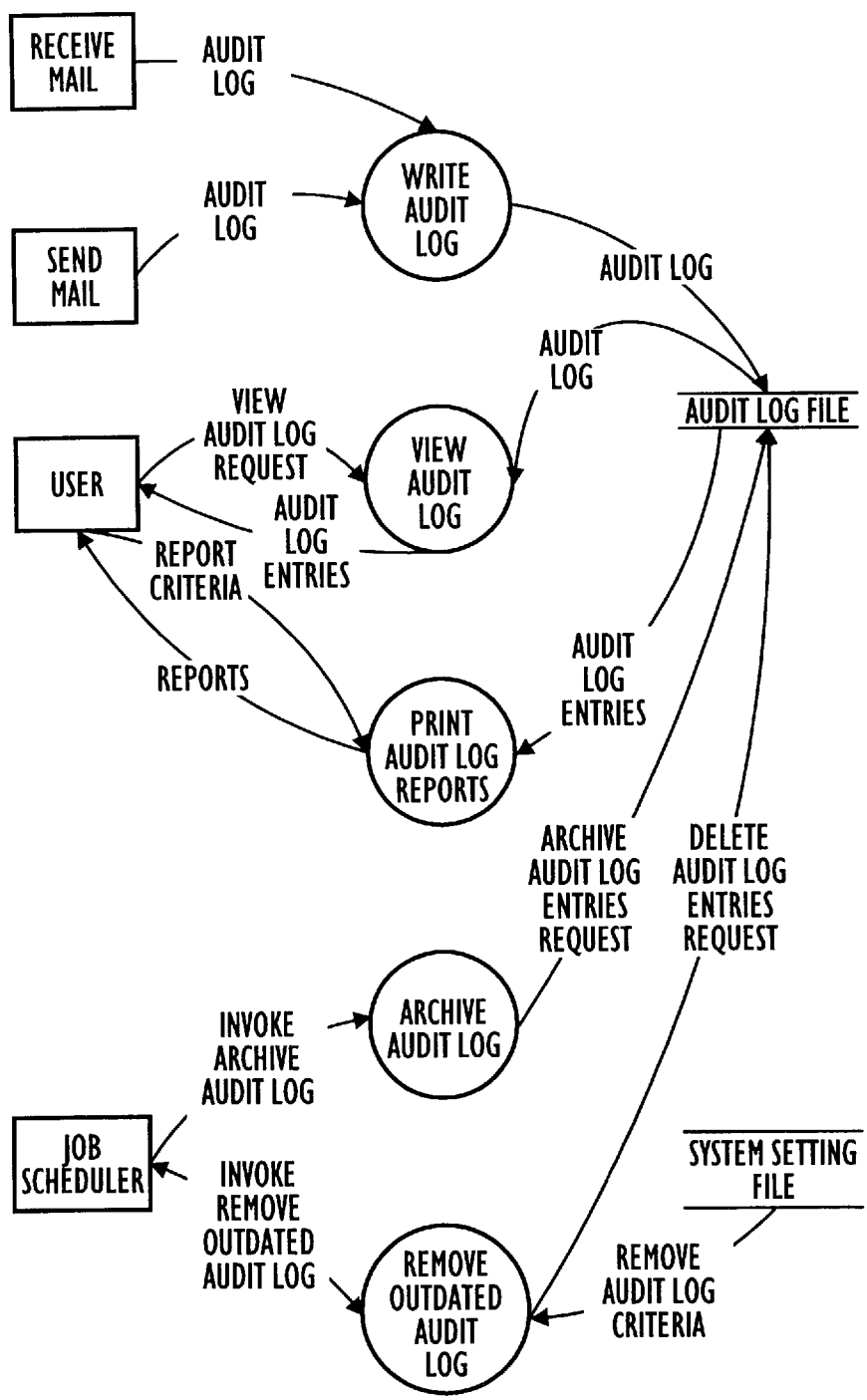
FIG. 7 is a functional flow diagram, similar to FIG. 4, of audit log management in accordance with the presently preferred method and system of the present invention.
Figure 8:
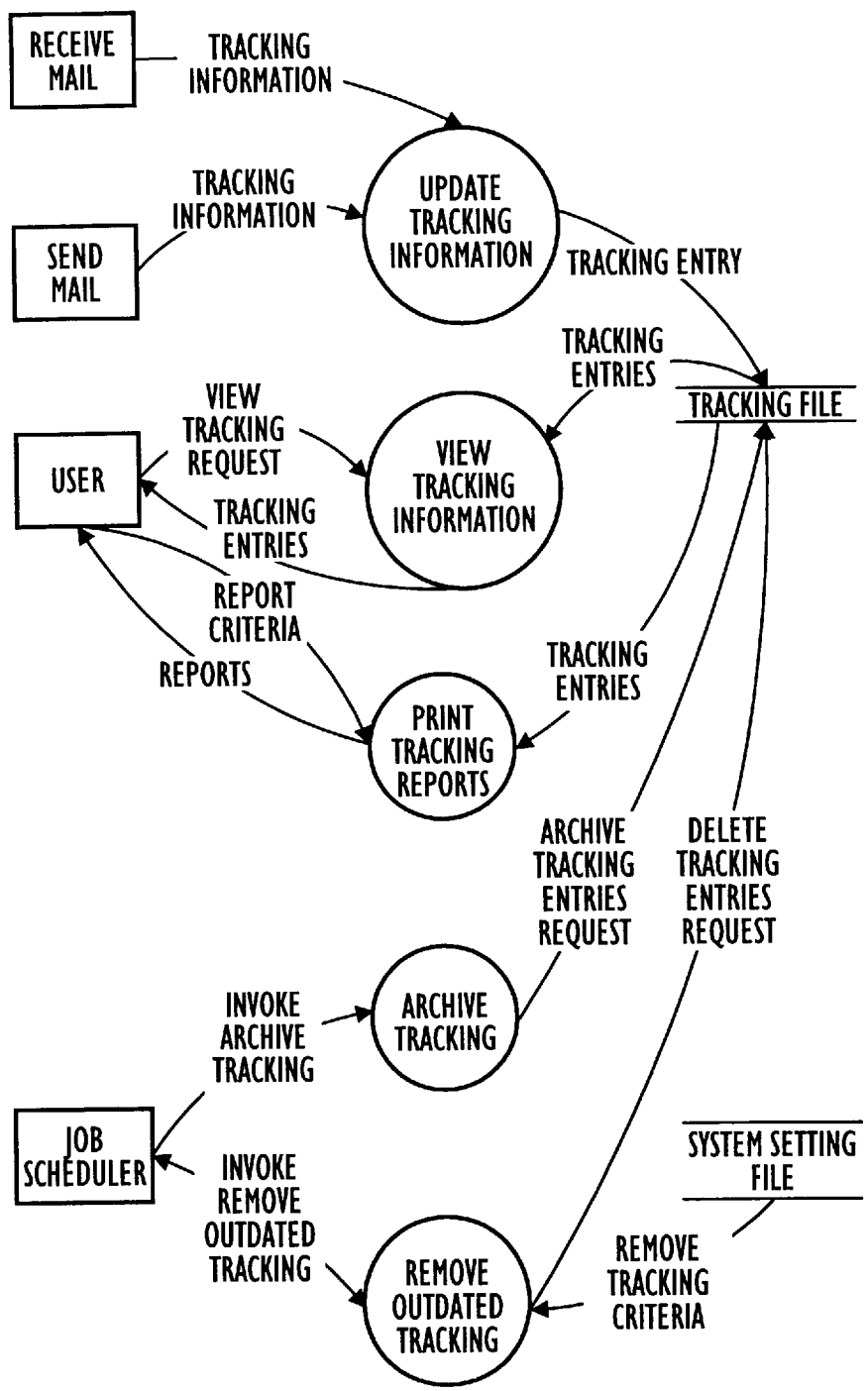
FIG. 8 is a functional flow diagram, similar to FIG. 4, of tracking management in accordance with the presently preferred method and system of the present invention.
Figure 9:
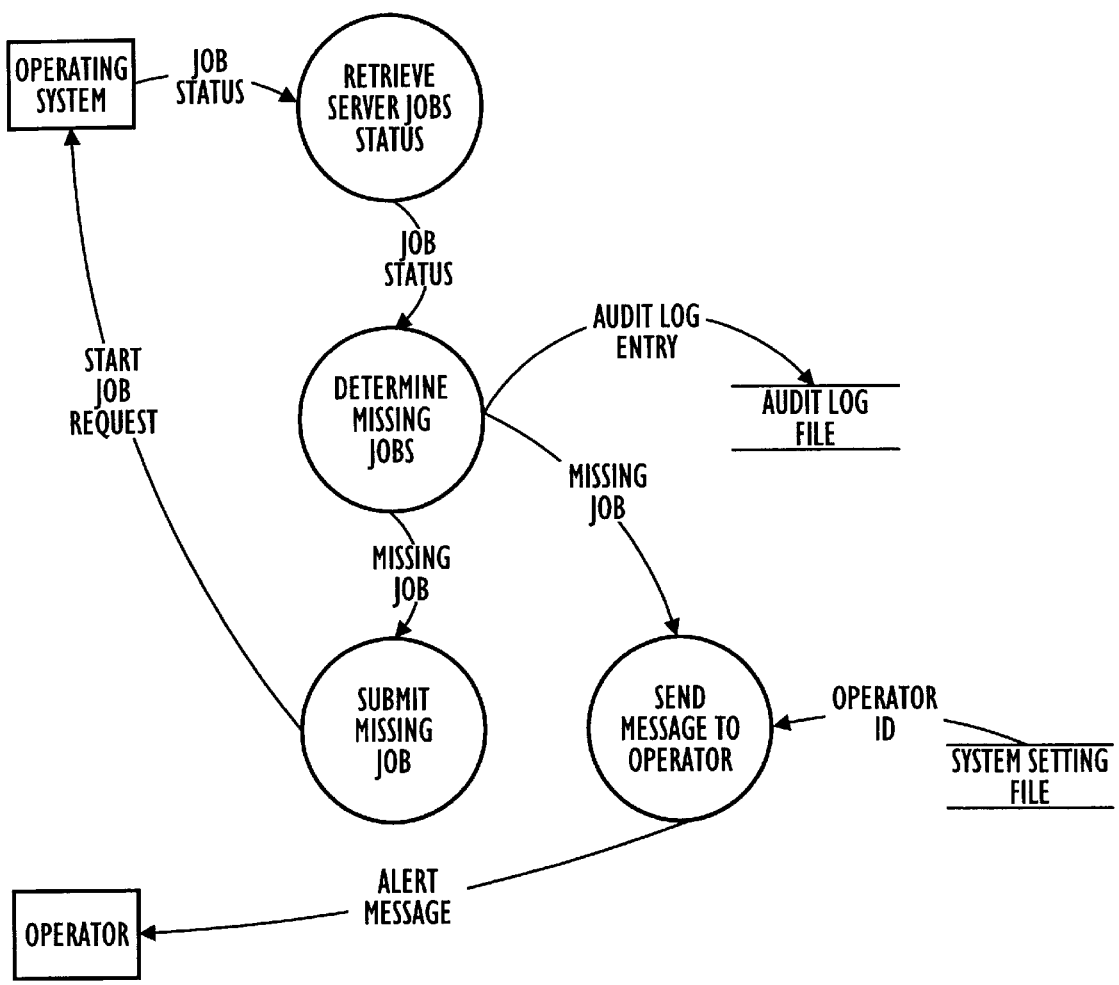
FIG. 9 is a functional flow diagram, similar to FIG. 4, of job monitoring in accordance with the presently preferred method and system of the present invention.

Referring now to FIGS. 4–5, a process flow diagram of the presently preferred method of receiving and sending E-mail, respectively, in accordance with the presently preferred method of the present invention is shown. In this regard, TEMPLAR, the controller for carrying out the opresently preferred method of the present invention, preferably sits between the conventional mailer and the user specified EDI flat-file on the sending and receiving systems, with the conventional SENDMAIL supplied with the UNIX X-WINDOWS OR MICROSOFT WINDOWS operating system being preferably used to send and receive mail, with the mail which is being sent and received preferably being MIME compliant, and with PKCS being preferably used to encrypt and decrypt MIME encoded body parts. Preferably, the MIME identifiers are not encrypted. As noted above, the EDIFACT AUTACK message is preferably used to deliver secure authentication, non-repudiation of origin and/or receipt, and acknowledgement or denial of acknowledgement for one or more X.12 or EDIFACT envelopes. Preferably, multiple EDI envelopes are viewed as one block of data in the system of the present invention. Preferably, if a received AUTACK message fails message integrity, an acknowledgement of receipt is not sent back to the original sender of the message, although, if desired, the system can be readily modified to accomplish this.

Referring now to FIGS. 6–9, these are process flow diagrams with respect to trading partner management, audit log management, tracking management, and job monitoring, respectively, in accordance with the presently preferred method of the present invention. These diagrams are self explanatory when considered in conjunction with the foregoing discussion and will not be described in any greater detail hereinafter.

Figure 10:
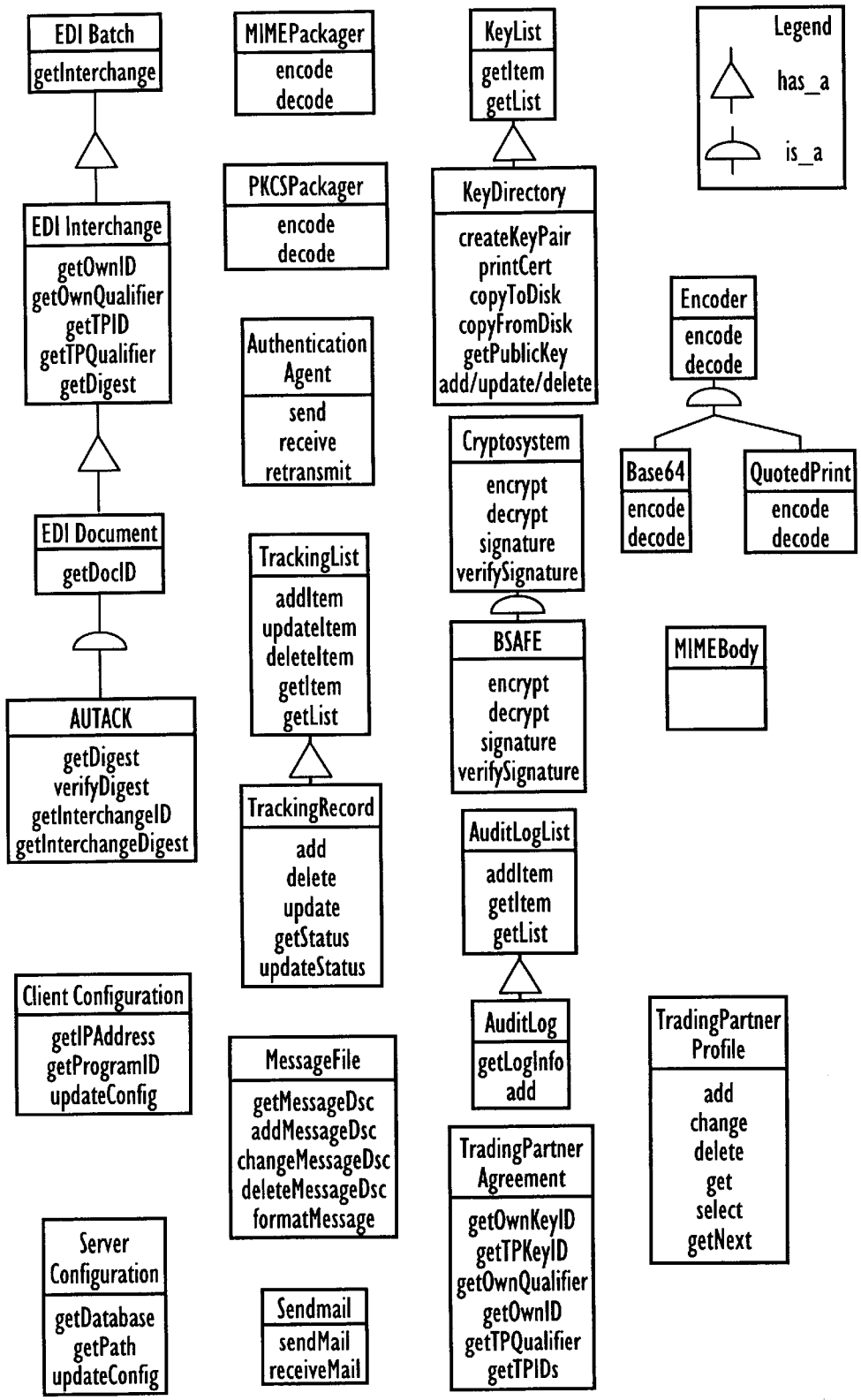
FIG. 10 is a functional diagram of the organization of the system employed in carrying out the presently preferred method of the present invention.

FIG. 10 is a functional diagram of the organization of the presently preferred method of the present invention as represented by the script of TABLE A and the foregoing discussion and will not be described in any greater detail hereinafter.

Figure 11A:
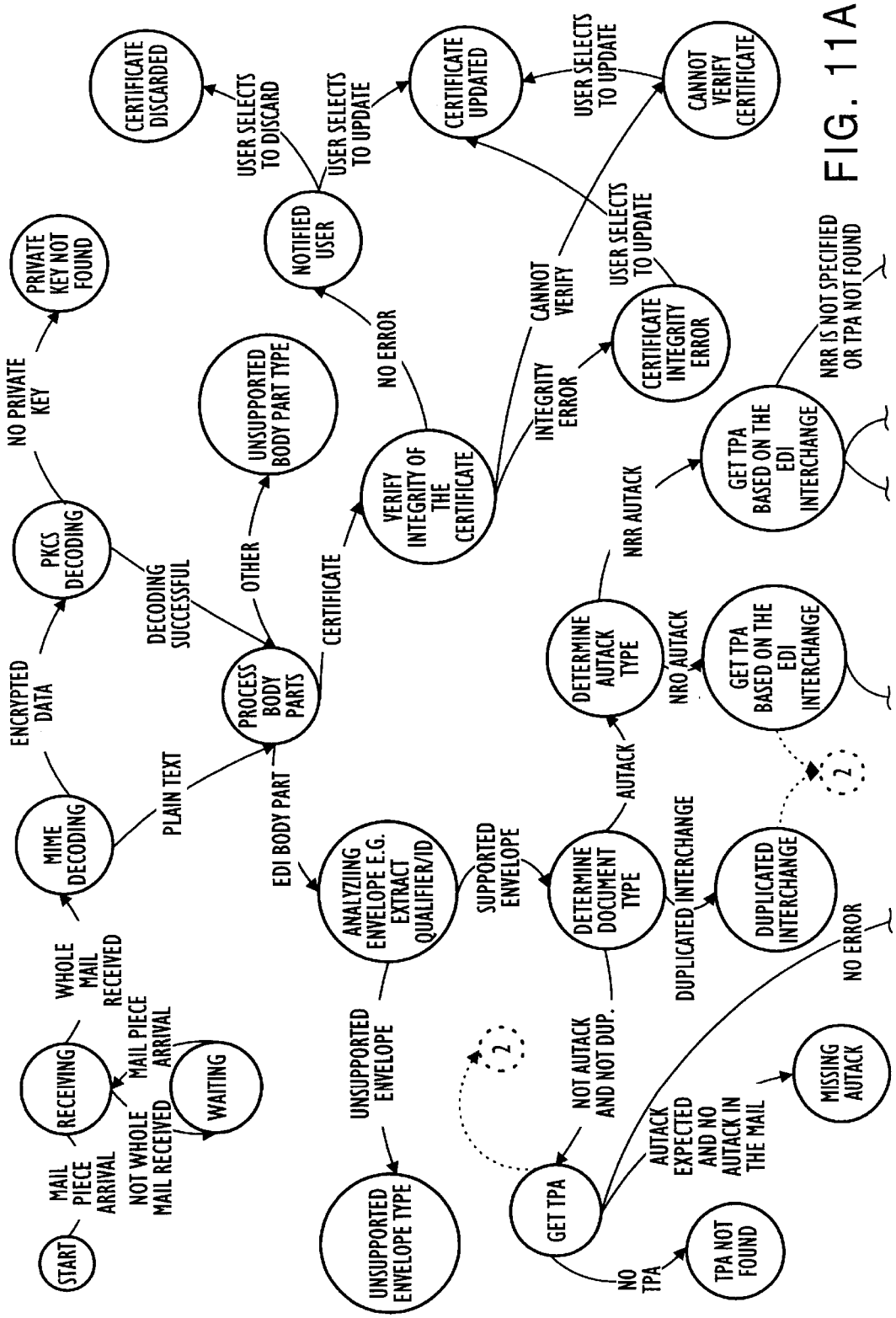
FIGS. 11A, 11B, 12, 13A, and 13B comprise a functional flow diagram, similar to FIG. 4, of the overall presently preferred method and system of FIGS. 1–10, with FIG. 11 illustrating certificate verification, FIG. 12 illustrating TPA processing, and FIG. 13 illustrating public key/private key processing.
Figure 11B:
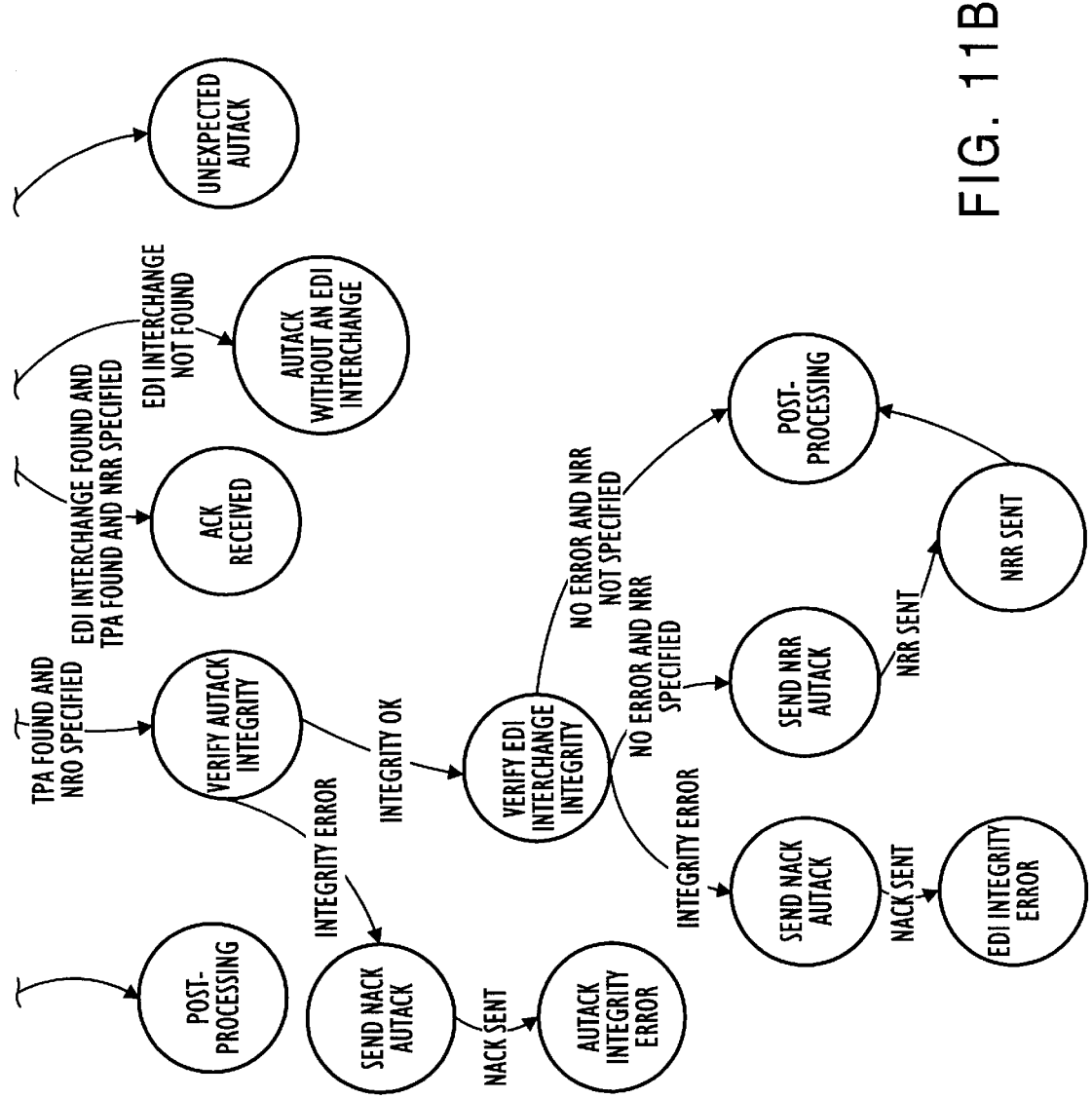
Figure 12:
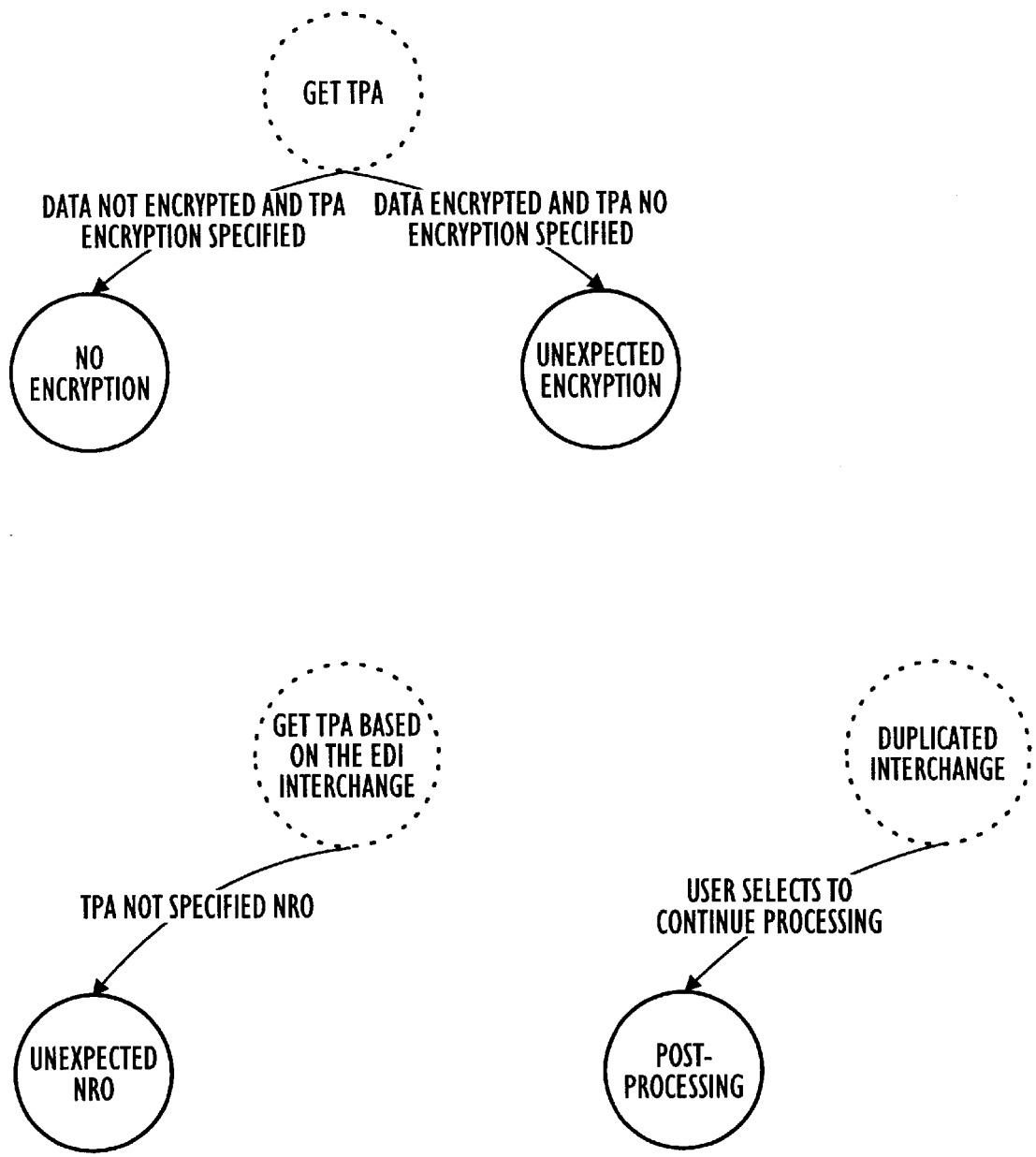
Figure 13A:
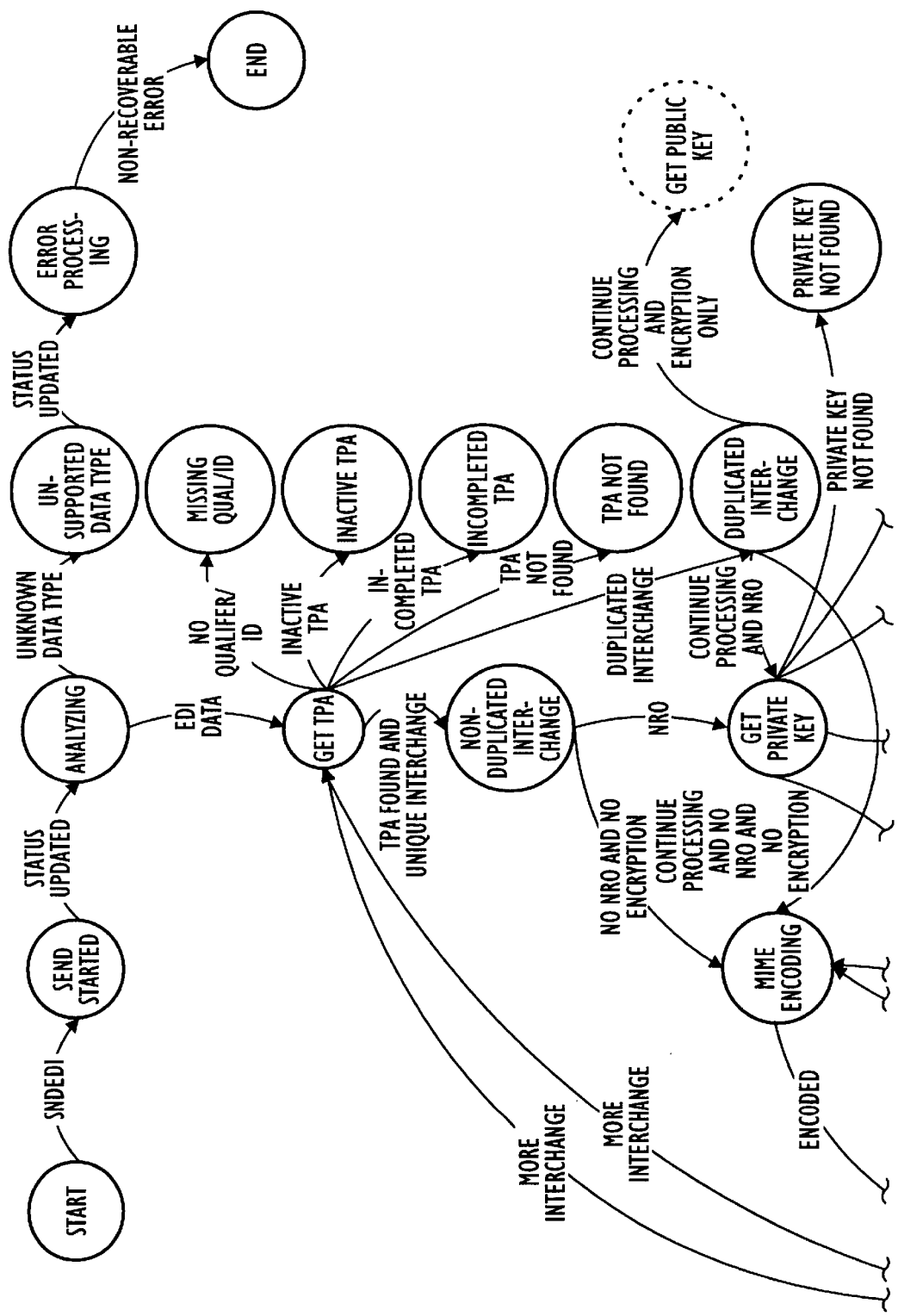
Figure 13B:
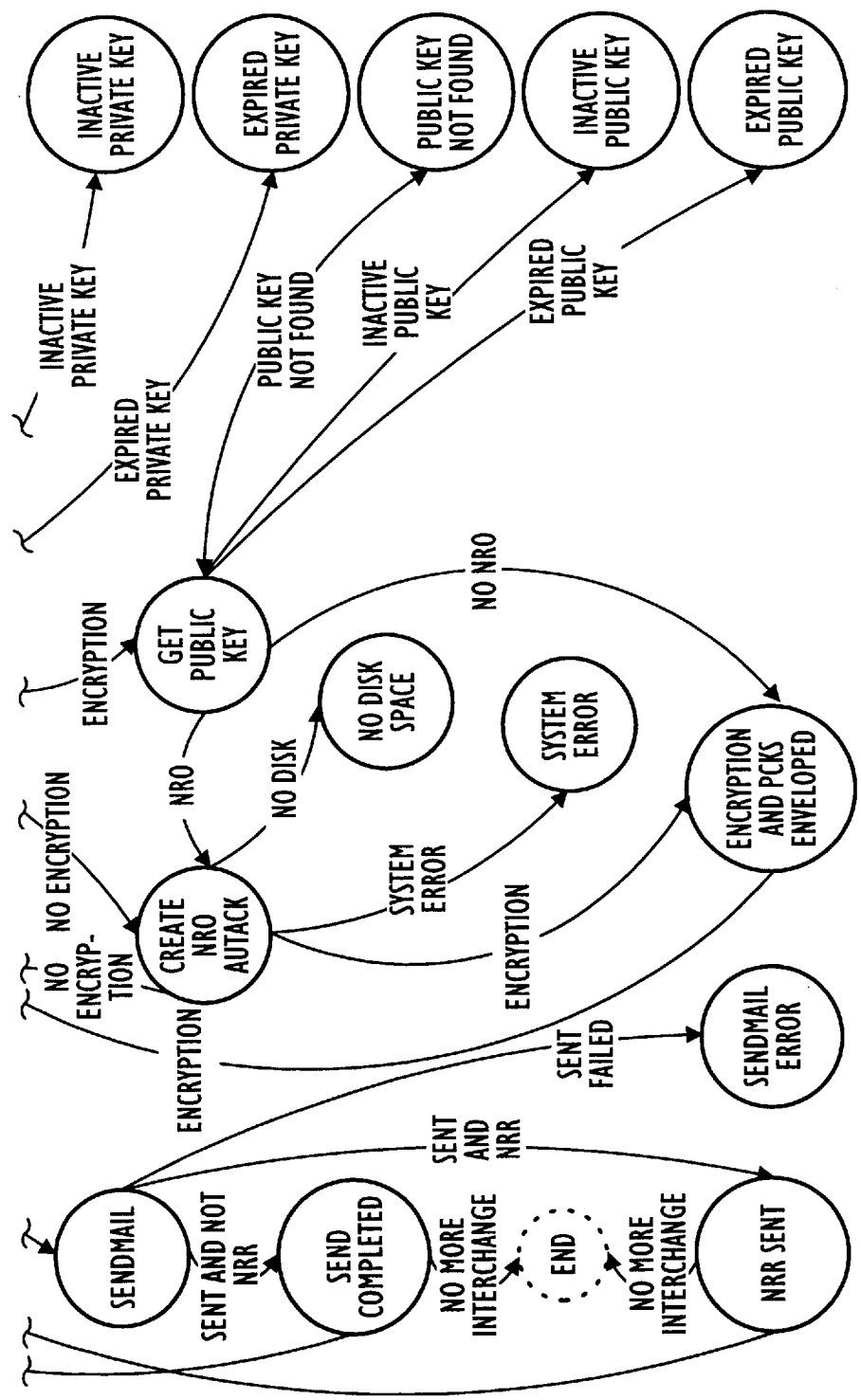

Lastly, FIGS. 11A–13B comprise a process flow diagram of the presently preferred method of the present invention in accordance with the foregoing description, with FIGS. 11A and 11B illustrating various steps of verification of the integrity of the AUTACK, the EDI interchange, and the certificate, with NRO representing non-repudiation of origin and NRR representing non-repudiation of receipt. FIG. 12 illustrates the portion of the method devoted to TPA processing. FIGS. 13A and 13B illustrate the portion of the method of the present invention devoted to processing of the public and private keys, as well as TPA, in carrying out the method of the present invention as described above.

Thus, by utilizing the AUTACK message as a document for the digital signature which is signed based on a public/private key system, such as RSA, an efficient, highly secure mailer for EDI over an open network, such as the INTERNET, is provided in which trading partners may readily obtain secure verification and authentication and non-repudiation of both origin and receipt, all of which are important in fast moving electronic business transactions over a widely dispersed geographic area in which an open network is the most viable communication media.

What is claimed is:

1. In a public key/private key secure communication system for selectively interconnecting a plurality of computers over an open public network, said plurality of computers comprising a sender computer and a recipient computer, said sender and recipient computers exchanging secure digital messages there between, said sender computer having a first associated public key and a first associated private key, said recipient computer having a second associated public key and a second associated private key, said digital messages comprising an EDI interchange communication between said sender computer and said recipient computer, said EDI interchange communication having an associated EDI acknowledgment message; the improvement in said secure open network communication system comprising means for computing a first hash for said EDI interchange communication from said sender computer;

means for inserting said first hash in a predetermined location in said associated EDI acknowledgment message;

means for computing a second hash of said associated EDI acknowledgment message;

means for digitally signing said associated EDI acknowledgment message, said message digitally signing means comprising means for encrypting said second hash with said sender computer's private key;

means for inserting said second hash in a predetermined location in said associated EDI acknowledgment message;

means for transmitting said EDI interchange communication along with said digitally signed associated EDI acknowledgment message to said recipient computer over said open public network; and means associated with said recipient computer for receiving and processing said received EDI interchange communication and said digitally signed EDI acknowledgment message for providing authentication and non-repudiation of said EDI interchange communication from said sender computer, said means comprising means for decrypting said encrypted second hash with said sender computer's public key; whereby secure private EDI interchange communications can occur over said open public network while providing authentication and non-repudiation of said EDI communications.

2. An improved secure open network communication system in accordance with claim 1 wherein said means associated with said recipient computer further comprises means for computing a third hash of said received EDI acknowledgement message; and means for comparing said third hash with said decrypted second hash from said received EDI acknowledgement message, said comparing means comprising means for providing an indication of integrity of said EDI acknowledgement message and non-repudiation of origin when said decrypted second hash and said third hash match.

3. An improved secure open network communication system in accordance with claim 2 wherein said means associated with said recipient computer further comprises means for computing a fourth hash of said received EDI interchange communication; and means for comparing said fourth hash of said received EDI interchange communication with said first hash in said received EDI acknowledgement message, said comparing means comprising means for providing an indication of integrity and verification of authenticity of said EDI interchange communication and non-repudiation of origin when said first and fourth hash match.

4. An improved secure open network communication system in accordance with claim 3 wherein said means associated with said recipient computer further comprises means for creating a reply EDI acknowledgement message and transmitting said reply EDI acknowledgement message to said sender computer over said open public network, said reply EDI acknowledgement message creating means comprising means for computing a fifth hash of said reply EDI acknowledgement message and for digitally signing said fifth hash by encrypting said fifth hash with said recipient computer's private key; and means for inserting said digitally signed fifth hash into a predetermined location in said transmitted reply EDI acknowledgement message.

5. An improved secure open network communication system in accordance with claim 4 further comprising means associated with said sender computer for receiving said transmitted reply EDI acknowledgement message, and for decrypting said encrypted fifth hash with said recipient computer's public key for verifying said digital signature of said reply EDI acknowledgement message; and means for computing a sixth hash of said received reply reply EDI acknowledgement message; and means for comparing said sixth hash against said decrypted fifth hash, said comparing means comprising means for providing an indication of integrity of said received reply EDI acknowledgement message and non-repudiation of origin of said reply EDI acknowledgement message; whereby non-repudiation of receipt of said EDI interchange communication is established by said sender computer.

6. An improved secure open network communication system in accordance with claim 5 wherein said means for creating said reply EDI acknowledgement message further comprises means for inserting said fourth hash in a predetermined location in said transmitted reply EDI acknowledgement message, and said means associated with said sender computer further comprises means for comparing said fourth hash in said received reply EDI acknowledgement message with said first hash, said comparing means providing an indication of integrity and authenticity of said EDI interchange when said first and fourth hash match.

7. An improved secure open network communication system in accordance with claim 6 wherein said EDI acknowledgement message comprises an AUTACK message.

8. An improved secure open network communication system in accordance with claim 7 wherein said reply EDI acknowledgement message comprises an AUTACK message.

9. An improved secure open network communication system in accordance with claim 8 wherein each of said hashes comprise an MD5.

10. An improved secure open network communication system in accordance with claim 9 wherein said public and private keys comprise an RSA type cryptographic communication system.

11. An improved secure open network communication system in accordance with claim 10 wherein said open public network comprises the Internet.

12. An improved secure open network communication system in accordance with claim 4 wherein said means for creating said reply EDI acknowledgement message further comprises means for inserting said fourth hash in a predetermined location in said transmitted reply EDI acknowledgement message, and said means associated with said sender computer further comprises means for comparing said fourth hash in said received reply EDI acknowledgement message with said first hash, said comparing means providing an indication of integrity and authenticity of said EDI interchange when said first and fourth hash match.

13. An improved secure open network communication system in accordance with claim 1 wherein said open public network comprises the Internet.

14. An improved secure open network communication system in accordance with claim 1 wherein said means associated with said recipient computer further comprises means for creating a reply EDI acknowledgement message and transmitting said reply EDI acknowledgement message to said sender computer over said open public network, said reply EDI acknowledgement message creating means comprising means for computing a third hash of said reply EDI acknowledgement message and for digitally signing said third hash by encrypting said third hash with said recipient computer's private key; and means for inserting said digitally signed third hash into a predetermined location in said transmitted reply EDI acknowledgement message.

15. An improved secure open network communication system in accordance with claim 14 wherein said open public network comprises the Internet.

16. An improved secure open network communication system in accordance with claim 15 further comprising means associated with said sender computer for receiving said transmitted reply EDI acknowledgement message, and for decrypting said encrypted third hash with said recipient computer's public key for verifying said digital signature of said reply EDI acknowledgement message; and means for computing a fourth hash of said received reply reply EDI acknowledgement message; and means for comparing said fourth hash against said decrypted third hash, said comparing means comprising means for providing an indication of integrity of said received reply EDI acknowledgement message and non-repudiation of origin of said reply EDI acknowledgement message; whereby non-repudiation of receipt of said EDI interchange communication is established by said sender computer.

17. An improved secure open network communication system in accordance with claim 14 further comprising means associated with said sender computer for receiving said transmitted reply EDI acknowledgement message, and for decrypting said encrypted third hash with said recipient computer's public key for verifying said digital signature of said reply EDI acknowledgement message; and means for computing a fourth hash of said received reply reply EDI acknowledgement message; and means for comparing said fourth hash against said decrypted third hash, said comparing means comprising means for providing an indication of integrity of said received reply EDI acknowledgement message and non-repudiation of origin of said reply EDI acknowledgement message; whereby non-repudiation of receipt of said EDI interchange communication is established by said sender computer.

18. An improved secure open network communication system in accordance with claim 14 wherein said EDI acknowledgement message comprises an AUTACK message.

19. An improved secure open network communication system in accordance with claim 18 wherein said reply EDI acknowledgement message comprises an AUTACK message.

20. An improved secure open network communication system in accordance with claim 14 wherein said reply EDI acknowledgement message comprises an AUTACK message.

21. An improved secure open network communication system in accordance with claim 1 wherein said EDI acknowledgement message comprises an AUTACK message.

22. An improved secure open network communication system in accordance with claim 21 wherein said open public network comprises the Internet.

23. An improved secure open network communication system in accordance with claim 22 wherein each of said hashes comprise an MD5.

24. An improved secure open network communication system in accordance with claim 1 wherein each of said hashes comprise an MD5.

25. An improved secure open network communication system in accordance with claim 24 wherein said open public network comprises the Internet.

26. An improved secure open network communication system in accordance with claim 24 where said EDI acknowledgement message comprises an AUTACK message.

27. An improved secure open network communication system in accordance with claim 26 wherein said public and private keys comprise an RSA type cryptographic communication system.

28. An improved secure open network communication system in accordance with claim 27 wherein said open public network comprises the Internet.

29. An improved secure open network communication system in accordance with claim 1 wherein said public and private keys comprise an RSA type cryptographic communication system.

30. An improved secure open network communication system in accordance with claim 29 wherein said open public network comprises the Internet.

31. An improved secure open network communication system in accordance with claim 1 further comprising means for generating a trading partner agreement communication between said sender computer and said recipient computer, said sender computer and said recipient computer comprising trading partners, said trading partner agreement communication comprising said public keys in said EDI interchange communication for enabling said ttrading partners to provide certification to each other.

32. An improved secure open network communication system in accordance with claim 31 wherein said open public network comprises the Internet.

33. An improved secure open network communication system in accordance with claim 32 wherein said EDI acknowledgement message comprises an AUTACK message.

34. An improved secure open network communication system in accordance with claim 31 wherein said EDI acknowledgement message comprises an AUTACK message.

35. A method for selectively interconnecting a plurality of computers over an open public network for providing a computer exchange of private secure digital messages between a sender computer and a recipient computer in said plurality of computers, said sender computer having a first associated public key and a first associated private key, said recipient computer having a second associated public key and a second associated private key, said digital messages comprising an EDI interchange communication between said sender computer and said recipient computer, said EDI interchange communication having an associated EDI acknowledgment message, said method comprising the steps of digitally signing said associated EDI acknowledgement message with said sender computer's private key; transmitting said EDI interchange communication along with said digitally signed associated EDI acknowledgement message to said recipient computer over said open public network; and processing said received digitally signed EDI acknowledgement message for providing authentication and non-repudiation of said EDI interchange communication from said sender computer, said processing step comprising the step of processing said received digitally signed associated EDI acknowledgement message with said sender's public key; whereby secure private EDI interchange communications can occur over an open public network while providing authentication and non-repudiation of said EDI communications using said associated EDI acknowledgement message.

36. A method for providing secure private communications over an open public network in accordance with claim 35 wherein said open public network comprises the Internet.

37. A method for providing secure private communications over an open public network in accordance with claim 36 further comprising the steps of creating a reply EDI acknowledgement message from said recipient computer; digitally signing said reply EDI acknowledgement message with said recipient computer's private key; transmitting said digitally signed reply EDI acknowledgement message to said sender computer over said open public network, said sender computer receiving said digitally signed reply EDI acknowledgement message; and processing said received digitally signed reply EDI acknowledgement message for providing non-repudiation of receipt of said EDI interchange communication by said sender computer, said processing step comprising the step of processing said received digitally signed reply EDI acknowledgement message with said recipient computer's public key; whereby non-repudiation of receipt of said EDI interchange communication is established by said sender computer.

38. A method for providing secure private communications over an open public network in accordance with claim 35 further comprising the steps of creating a reply EDI acknowledgement message from said recipient computer; digitally signing said reply EDI acknowledgement message with said recipient computer's private key; transmitting said digitally signed reply EDI acknowledgement message to said sender computer over said open public network, said sender computer receiving said digitally signed reply EDI acknowledgement message; and processing said received digitally signed reply EDI acknowledgement message for providing non-repudiation of receipt of said EDI interchange communication by said sender computer, said processing step comprising the step of processing said received digitally signed reply EDI acknowledgement message with said recipient computer's public key; whereby non-repudiation of receipt of said EDI interchange communication is established by said sender computer.

39. A method for providing secure private communications over an open public network in accordance with claim 38 wherein said processing step further comprises the step of providing non-repudiation of origin at said recipient computer from said received EDI aknowledgement message.

40. A method for providing secure private communications over an open public network in accordance with claim 39 wherein said open public network comprises the Internet.

41. A method for providing secure private communications over an open public network in accordance with claim 38 wherein said reply EDI acknowledgement message comprises an AUTACK message.

42. A method for providing secure private communications over an open public network in accordance with claim 41 wherein said EDI acknowledgement message comprises an AUTACK message.

43. A method for providing secure private communications over an open public network in accordance with claim 35 wherein said processing step further comprises the step of providing non-repudiation of origin at said recipient computer from said received EDI aknowledgement message.

44. A method for providing secure private communications over an open public network in accordance with claim 35 wherein said EDI acknowledgement message comprises an AUTACK message.

45. A method for providing secure private communications over an open public network in accordance with claim 35 wherein said public and private keys comprise an RSA type cryptographic communication system.

46. A method for providing secure private communications over an open public network in accordance with claim 45 wherein said open public network comprises the Internet.

47. A method for providing secure private communications over an open public network in accordance with claim 45 wherein said EDI acknowledgement message comprises an AUTACK message.

48. A method for providing secure private communications over an open public network in accordance with claim 47 further comprising the steps of creating a reply EDI acknowledgement message from said recipient computer; digitally signing said reply EDI acknowledgement message with said recipient computer's private key; transmitting said digitally signed reply EDI acknowledgement message to said sender computer over said open public network, said sender computer receiving said digitally signed reply EDI acknowledgement message; and processing said received digitally signed reply EDI acknowledgement message for providing non-repudiation of receipt of said EDI interchange communication by said sender computer, said processing step comprising the step of processing said received digitally signed reply EDI acknowledgement message with said recipient computer's public key; whereby non-repudiation of receipt of said EDI interchange communication is established by said sender computer.

49. A method for providing secure private communications over an open public network in accordance with claim 48 wherein said reply EDI acknowledgement message comprises an an AUTACK message.

50. A method for providing secure private communications over an open public network in accordance with claim 49 wherein said open public network comprises the Internet.

* * * * *

(12) EX PARTE REEXAMINATION CERTIFICATE (7000th)
United States Patent
Jenkins et al.

(10) Number: US 5,812,669 C1
(45) Certificate Issued: Aug. 18, 2009

(54) METHOD AND SYSTEM FOR PROVIDING SECURE EDI OVER AN OPEN NETWORK

(75) Inventors: Lew Jenkins, Pleasant Hill, CA (US); Emmanuel K. Pasetes, Jr., Danville, CA (US)

(73) Assignee: Classified Information, Inc., San Marcos, CA (US)

Reexamination Request:
No. 90/010,141, Apr. 14, 2008

Reexamination Certificate for:
Patent No.: 5,812,669
Issued: Sep. 22, 1998
Appl. No.: 08/503,984
Filed: Jul. 19, 1995

(51) Int. Cl.
*H04L 9/00* (2006.01)
*H04L 9/30* (2006.01)
*H04L 9/32* (2006.01)
*H04L 29/06* (2006.01)

(52) U.S. Cl. .................. 713/161; 380/30; 713/176; 713/181; 713/170; 705/75

(58) Field of Classification Search .................. None
See application file for complete search history.

(56) References Cited

U.S. PATENT DOCUMENTS 5,659,616 A    8/1997   Sudia ....................... 380/23

OTHER PUBLICATIONS

Stallings, W., "Pretty Good Privacy," 1994, http://www.byte.com/art/9407/sec12/art4.htm, downloaded from the Internet on Mar. 21, 2008, 4 pages.

Costanzo, A., et al., "Encoding Header Field for Internet Messages", RFC 1505, Computervision Corp., Aug. 1993, 39 pages, http://rfc/dotsrc.org/rfc/rfc1505.html, retrieved from the Internet on Apr. 14, 2008.
UN/Edifact. "AUTACK Message Implementation Guidelines". United Nations Trade/WP.4/R.1026/Add.4., 1994.
UN/Edifact. "Edifact Security Implementation Guidelines". United Nations Trade/WP.4/R.1026/Add.2., 1994.
UN/Edifact. "AUTACK message". United Nations Trade/WP.4/R.1026/Add.3., 1994.

*Primary Examiner*—Matthew Heneghan

(57) ABSTRACT

A method and system for selectively interconnecting a plurality of computers (112,114) over an open public network (120,102,122), such as the INTERNET, provides a private secure computer exchange of EDI interchange communications between a sender computer (112) and a recipient computer (114), each of which has an associated public key and an associated private key, such as in an RSA type cryptographic communication system (100). The associated EDI acknowledgement message, such as the AUTACK, is used to provide secure authentication and non-repudiation of both origin and receipt of the secure private EDI interchange communications transmitted over the open public network (120,102,122) with the AUTACK transmitted from the sender computer (112) being digitally signed with the sender's private key, and with the reply AUTACK transmitted from the recipient computer (114) being digitally signed with the recipient's private key. The respective digitally signed AUTACKs are decrypted after receipt by using the public key associated with the private key used to provide the digital signature. The transmitted AUTACK from the sender computer (112) includes an MD5 for the entire EDI interchange as well as an MD5 of the AUTACK, with the AUTACK, thus, being used to provide the digital signature. The reply AUTACK from the recipient computer (114) includes an MD5 of the reply AUTACK. The ability to conduct business over the network (120,102,122) is controlled by private trading partner agreement communications which provide key certification.

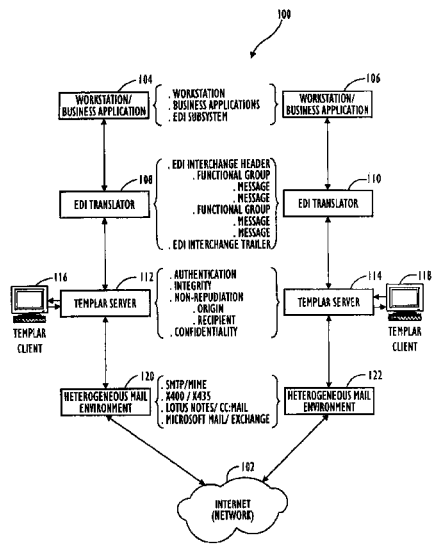

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–4, 12–15 and 18–34 is confirmed.

Claims 5, 16, 17, 35, 39, 43, 44 and 49 are determined to be patentable as amended.

Claims 6–11, 36–38, 40–42, 45–48 and 50, dependent on an amended claim, are determined to be patentable.

5. An improved secure open network communication system in accordance with claim 4 further comprising means associated with said sender computer for receiving said transmitted reply EDI acknowledgement message, and for decrypting said encrypted fifth hash with said recipient computer's public key for verifying said digital signature of said reply EDI acknowledgement message; and means for computing a sixth hash of said received reply [reply] EDI acknowledgement message; and means for comparing said sixth hash against said decrypted fifth hash, said comparing means comprising means for providing an indication of integrity of said received reply EDI acknowledgement message and non-repudiation of origin of said reply EDI acknowledgement message; whereby non-repudiation of receipt of said EDI interchange communication is established by said sender computer.

16. An improved secure open network communication system in accordance with claim 15 further comprising means associated with said sender computer for receiving said transmitted reply EDI acknowledgement message, and for decrypting said encrypted third hash with said recipient computer's public key for verifying said digital signature of said reply EDI acknowledgement message; and means for computing a fourth hash of said received reply [reply] EDI acknowledgement message; and means for comparing said fourth hash against said decrypted third hash, said comparing means comprising means for providing an indication of integrity of said received reply EDI acknowledgement message and non-repudiation of origin of said reply EDI acknowledgement message; whereby non-repudiation of receipt of said EDI interchange communication is established by said sender computer.

17. An improved secure open network communication system in accordance with claim 14 further comprising means associated with said sender computer for receiving said transmitted reply EDI acknowledgement message, and for decrypting said encrypted third hash with said recipient computer's public key for verifying said digital signature of said reply EDI acknowledgement message; and means for computing a fourth hash of said received reply [reply] EDI acknowledgement message; and means for comparing said fourth hash against said decrypted third hash, said comparing means comprising means for providing an indication of integrity of said received reply EDI acknowledgement message and non-repudiation of origin of said reply EDI acknowledgement message; whereby non-repudiation of receipt of said EDI interchange communication is established by said sender computer.

35. A method for selectively interconnecting a plurality of computers over an open public network for providing a computer exchange of private secure digital messages between a sender computer and a recipient computer in said plurality of computers, said sender computer having a first associated public key and a first associated private key, said recipient computer having a second associated public key and a second associated private key, said digital messages comprising an EDI interchange communication between said sender computer and said recipient computer, said EDI interchange communication having an associated *sender's* EDI acknowledgment message, said method comprising the steps of:

computing a first hash for said EDI interchange communication from said sender computer;

packaging said EDI interchange communication with the associated sender's EDI acknowledgment message to generate a packaged associated sender's EDI acknowledgment message;

digitally signing said *packaged* associated *sender's* EDI acknowledgement message with said sender computer's private key, *wherein said digitally signing includes generating a digital signature associated with the packaged associated sender's EDI acknowledgement message, and wherein said generating comprises computing a second hash for said packaged associated sender's EDI acknowledgment message*;

transmitting said EDI interchange communication along with said digitally signed *packaged* associated *sender's* EDI acknowledgement message to said recipient computer over said open public network; and processing said received digitally signed *packaged associated sender's* EDI acknowledgement message for providing authentication and non-repudiation of said EDI interchange communication from said sender computer, said processing step comprising the step of processing said received digitally signed *packaged* associated *sender's* EDI acknowledgement message with said sender's public key; whereby secure private EDI interchange communications can occur over an open public network while providing authentication and non-repudiation of said EDI communication using said associated *sender's* EDI acknowledgement message.

39. A method for providing secure private communications over an open public network in accordance with claim 38 wherein said processing step further comprises the step of providing non-repudiation of origin at said recipient computer from said received EDI [aknowledgement] *acknowledgement* message.

43. A method for providing secure private communications over an open public network in accordance with claim 35 wherein said processing step further comprises the step of providing non-repudiation of origin at said recipient computer from said received EDI [aknowledgement] *acknowledgement* message.

44. A method for providing secure private communications over an open public network in accordance with claim 35 wherein said *associated sender's* EDI acknowledgement message comprises an AUTACK message.

49. A method for providing secure private communications over an open public network in accordance with claim 48 wherein said reply EDI acknowledgement message comprises an [an] AUTACK message.

* * * * *

(12) EX PARTE REEXAMINATION CERTIFICATE (8114th)
United States Patent
Jenkins et al.

(10) Number: US 5,812,669 C2
(45) Certificate Issued: Mar. 22, 2011

(54) METHOD AND SYSTEM FOR PROVIDING SECURE EDI OVER AN OPEN NETWORK

(75) Inventors: Lew Jenkins, Pleasant Hill, CA (US); Emmanuel K. Pasetes, Jr., Danville, CA (US)

(73) Assignee: Classified Information, Inc., San Marcos, CA (US)

Reexamination Request:
No. 90/010,588, Jul. 30, 2009

Reexamination Certificate for:
Patent No.: 5,812,669
Issued: Sep. 22, 1998
Appl. No.: 08/503,984
Filed: Jul. 19, 1995

Reexamination Certificate C1 5,812,669 issued Aug. 18, 2009

(51) Int. Cl.
   *H04L 9/32* (2006.01)
   *H04L 29/06* (2006.01)

(52) U.S. Cl. .............................. 713/161; 380/30; 705/75; 713/176; 713/181

(58) Field of Classification Search .................. None
See application file for complete search history.

(56) References Cited

PUBLICATIONS

Bradford, B., "EDI Moves from the Van to the Internet," University of Maryland, http://csrc.nist.gov/nissc/1996/papers/NISSC96/paper072_073_074/bradford.PDF downloaded from the Internet 2008, 11 pages.
Crocker D., "MIME Encapsulation of EDI Objects," Network Working Group, Mar. 1995, http://www.ietf.org/rfc/rfc1767.txt downloaded from the Internet Mar. 19, 2008, 7 pages.
Galvin, J., et al., "SNMP Security Protocols," Network Working Group, 1992, http://ietfreport.isoc.org/rfc/rfc1352.txt downloaded from the Internet Jun. 12, 2009, 36 pages.
Linn, J., "Privacy Enhancement for Internet Electronic Mail; Part I: Message Encryption and Authentication Procedures," Network Working Group, Feb. 1993, downloaded from the Internet Jun. 11, 2009, 52 pages.

(Continued)

*Primary Examiner*—Fred Ferris

(57) ABSTRACT

A method and system for selectively interconnecting a plurality of computers (112,114) over an open public network (120,102,122), such as the INTERNET, provides a private secure computer exchange of EDI interchange communications between a sender computer (112) and a recipient computer (114), each of which has an associated public key and an associated private key, such as in an RSA type cryptographic communication system (100). The associated EDI acknowledgement message, such as the AUTACK, is used to provide secure authentication and non-repudiation of both origin and receipt of the secure private EDI interchange communications transmitted over the open public network 120, 102, 122) with the AUTACK transmitted from the sender computer (112) being digitally signed with the sender's private key, and with the reply AUTACK transmitted from the recipient computer (114) being digitally signed with the recipient's private key. The respective digitally signed AUTACKs are decrypted after receipt by using the public key associated with the private key used to provide the digital signature. The transmitted AUTACK from the sender computer (112) includes an MD5 for the entire EDI interchange as well as an MD5 of the AUTACK, with the AUTACK, thus, being used to provide the digital signature. The reply AUTACK from the recipient computer (114) includes an MD5 of the reply AUTACK. The ability to conduct business over the network (120, 102, 122) is controlled by private trading partner agreement communications which provide key certification.

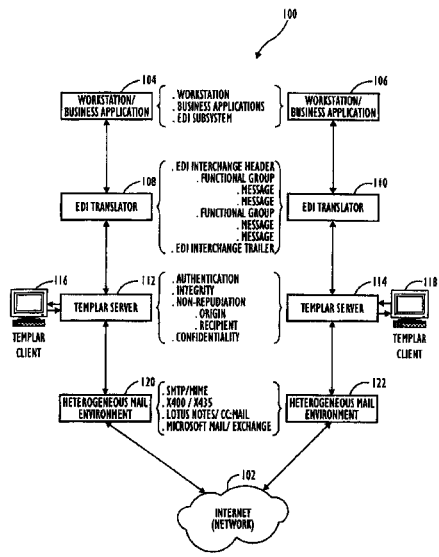

OTHER PUBLICATIONS

Stallings, W., "Pretty Good Privacy," 1994, http://www.byte.com/art/9407/sec12/art4.htm, downloaded from the Internet on Mar. 21, 2008, 4 pages.

UN/EDIFACT."MIG Handbook UN/EDIFACT Message AUTAK," United Nations TRADE/WP.4/R.1026/Add.4., Feb. 22, 1994, 46 pages.

UN/EDIFACT, "EDIFACT Security Implementation Guidelines," United Nations TRADE/WP.4/R.1026/Add.2. Feb. 22, 1994, 51 pages.

UN/EDIFACT, "AUTACK: Secure Authentification and Acknowledgement Message," United Nations TRADE/WP.4/R.1026/Add.3., Feb. 23, 1994, 22 pages.

Premenos and Cisco partner to conduct business on the internet; "live" pilot proves secure business–to–business transactions over open networks, Article from Business Wire, Nov. 7, 1994, http://www.highbeam.com/doc/1G1–15896393.html.

Premenos Technology Corp. to Present at the Hambrecht & Quist 25th Annual Technology Conference, PRNewswire, Apr. 30, 1997, http://multivu.prnewswire.com/cgi–bin/stories.pl?ACCT=104&STORY=/www/story/109116&EDATE=.

McKendrick, Joe, "SOA, EDI: and the beat goes on . . .", ZDNet, Mar. 4, 2005, http://www.zdnet.com/blog/service–oriented/soa–edi–and–the–beat–goes–on/208.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 35-50 is confirmed.

Claims 1-34 are cancelled.

\* \* \* \* \*